US008755841B2

(12) United States Patent
Lee et al.

(10) Patent No.: US 8,755,841 B2
(45) Date of Patent: Jun. 17, 2014

(54) APPARATUSES AND METHODS FOR PROVIDING MULTI-STANDBY MODE OF WIRELESS COMMUNICATIONS USING SINGLE SUBSCRIBER IDENTITY CARD WITH MULTIPLE SUBSCRIBER NUMBERS

(75) Inventors: Chih-Hung Lee, Kaohsiung (TW); Min-Ju Wu, Kaohsiung (TW); Nai-Hsin Chang, Taichung (TW); Jen-Chien Liu, New Taipei (TW)

(73) Assignee: Mediatek Inc., Hsin-Chu (TW)

( * ) Notice: Subject to any disclaimer, the term of this patent is extended or adjusted under 35 U.S.C. 154(b) by 333 days.

(21) Appl. No.: 13/182,313

(22) Filed: Jul. 13, 2011

(65) Prior Publication Data
US 2013/0017862 A1 Jan. 17, 2013

(51) Int. Cl.
*H04B 1/38* (2006.01)
(52) U.S. Cl.
USPC .......................................... 455/558
(58) Field of Classification Search
USPC .......................................... 455/558
See application file for complete search history.

(56) References Cited

U.S. PATENT DOCUMENTS

| 7,912,464 | B2* | 3/2011 | Jiang ........................ 455/432.1 |
| 7,912,497 | B2* | 3/2011 | Isidore et al. .............. 455/552.1 |
| 8,472,999 | B2* | 6/2013 | Zhang ....................... 455/552.1 |
| 2007/0099638 | A1* | 5/2007 | Voltz .......................... 455/500 |
| 2010/0048197 | A1* | 2/2010 | Jiang ........................ 455/422.1 |
| 2011/0117965 | A1* | 5/2011 | Gong et al. ................. 455/558 |
| 2011/0237297 | A1* | 9/2011 | Shin .......................... 455/558 |
| 2011/0286343 | A1* | 11/2011 | Powell et al. ............... 370/252 |

* cited by examiner

*Primary Examiner* — Nathan Mitchell
(74) *Attorney, Agent, or Firm* — McClure, Qualey & Rodack, LLP

(57) ABSTRACT

A communication device is provided with a processing unit. The processing unit reads a plurality of elementary files from a single subscriber identity card for each of a plurality of subscriber numbers when power-on, and registers to a network for each of the subscriber numbers according to the read elementary files. Also, the processing unit enables a multi-standby mode of wireless communications in response to successful registration to the network for at least two of the subscriber numbers.

22 Claims, 34 Drawing Sheets

APPARATUSES AND METHODS FOR PROVIDING MULTI-STANDBY MODE OF WIRELESS COMMUNICATIONS USING SINGLE SUBSCRIBER IDENTITY CARD WITH MULTIPLE SUBSCRIBER NUMBERS

BACKGROUND OF THE INVENTION

1. Field of the Invention

The invention generally relates to management of multiple subscriber numbers in a single subscriber identity card, and more particularly, to apparatuses and methods for providing a multi-standby mode of wireless communications using a single subscriber identity card with multiple subscriber numbers.

2. Description of the Related Art

With growing demand for ubiquitous computing and networking, various wireless communication technologies have been developed, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and others. Generally, a cellular phone only supports one wireless communication technology and provides the user the flexibility of mobile communications at all times via the supported wireless communication technology, regardless of his/her geographic location. Especially in today's business world, a cellular phone is becoming a necessary business tool for conducting business conveniently. For business people, having an additional cellular phone exclusive for business matters is a common choice, since they need to conduct business while out of the office or even out of the city/country. Others may find having an additional cellular phone is a good way to save/control the budget for wireless service charges (including phone services and/or data services). However, having two or more than two cellular phones may be troublesome when one has to switch frequently between the cellular phones and carry around all the cellular phones with himself/herself.

In order to provide a convenient way of having multiple subscriber numbers, dual-card cellular phones have been developed, which generally have two wireless communication modules for respectively performing wireless transmission and reception with an individual subscriber number. Alternatively, the design of a single subscriber identity card having a plurality of subscriber numbers has also been developed for a single-card cellular phones to retrieve the subscriber numbers in the single subscriber identity card and to be able to perform the wireless transmission and reception using different subscriber numbers. Note that, a single-card cellular phone, which supports a single subscriber identity card having a plurality of subscriber numbers, may only activate one subscriber number at a time via the Subscriber Identity Module (SIM) Application Toolkit (SAT). That is, only a single standby mode of wireless communications may be provided in the single-card cellular phone with the activated subscriber number. If the user decides to use wireless services with another subscriber number, he/she may have to manually switch the activated subscriber number to the desired one via the SAT. As a result, Mobile-Terminated (MT) calls associated with the inactivated subscriber numbers will be missed and inconveniences may occur.

BRIEF SUMMARY OF THE INVENTION

Accordingly, embodiments of the invention provide apparatuses and methods for providing a multi-standby mode of wireless communications using a single subscriber identity card with multiple subscriber numbers. In one aspect of the invention, a communication device comprising a processing unit is provided. The processing unit reads a plurality of elementary files from a single subscriber identity card for each of a plurality of subscriber numbers when power-on, and registers to a network for each of the subscriber numbers according to the read elementary files. Also, the processing unit enables a multi-standby mode of wireless communications in response to successful registration to the network for at least two of the subscriber numbers.

In another aspect of the invention, a method for providing a multi-standby mode, executed by a micro-processing unit (MPU) of a Baseband chip, is provided. The method comprises the steps of reading a plurality of elementary files from a single subscriber identity card for each of a plurality of subscriber numbers when power-on, registering to a network for each of the subscriber numbers according to the read elementary files, and enabling a multi-standby mode of wireless communications in response to successful registration to the network for at least two of the subscriber numbers.

In one aspect of the invention, a communication device comprising a processing unit is provided. The processing unit enables a multi-standby mode of wireless communications with a single subscriber identity card comprising a plurality of subscriber numbers, and polls a plurality of SIM instances in the subscriber identity card respectively corresponding to the subscriber numbers. Also, the processing unit determines whether there is any command waiting to be processed for each of the polled SIM instances, and if so, processes at least one determined command from the polled SIM instances.

In another aspect of the invention, a method for polling a single subscriber identity card comprising a plurality of subscriber numbers, executed by an MPU of a Baseband chip, is provided. The method comprises the steps of enabling a multi-standby mode of wireless communications with a subscriber identity card comprising a plurality of subscriber numbers, polling a plurality of SIM instances in the subscriber identity card respectively corresponding to the subscriber numbers, determining whether there is any command waiting to be processed corresponding to each of the polled SIM instances, and if so, processing at least one determined command from the polled SIM instances.

In one aspect of the invention, a communication device comprising a processing unit is provided. The processing unit enables a connected mode of wireless communications with one of a plurality of subscriber numbers in a single subscriber identity card, and polls a plurality of SIM instances in the subscriber identity card respectively corresponding to the subscriber numbers. Also, the processing unit determines whether the subscriber identity card remains detected and whether there is any command waiting to be processed for each of the polled SIM instances, and if so, processes at least one determined command from the polled SIM instances.

In another aspect of the invention, a method for polling a single subscriber identity card, executed by an MPU of a Baseband chip, is provided. The method comprises the steps of enabling a connected mode of wireless communications with one of a plurality of subscriber numbers, polling a plurality of SIM instances in the subscriber identity card respectively corresponding to the subscriber numbers, determining whether the subscriber identity card remains detected and whether there is any command waiting to be processed for each of the polled SIM instances, and if so, processing at least one determined command from the polled SIM instances.

In one aspect of the invention, a communication device comprising a processing unit is provided. The processing unit determines whether at least one elementary file in a single subscriber identity card is required to be read out. If so, the processing unit further activates one SIM instance in the subscriber identity card for the elementary file, and reads the elementary file from the subscriber identity card.

In another aspect of the invention, a method for accessing data in a single subscriber identity card, executed by an MPU of a Baseband chip, is provided. The method comprises the steps of determining whether at least one elementary file in the subscriber identity card is required to be read out, and if so, activating one SIM instance in the subscriber identity card for the elementary file, and reading the elementary file from the subscriber identity card.

Other aspects and features of the present invention will become apparent to those with ordinarily skill in the art upon review of the following descriptions of specific embodiments of the apparatus and methods for providing a multi-standby mode of wireless communications using a single subscriber identity card with multiple subscriber numbers.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
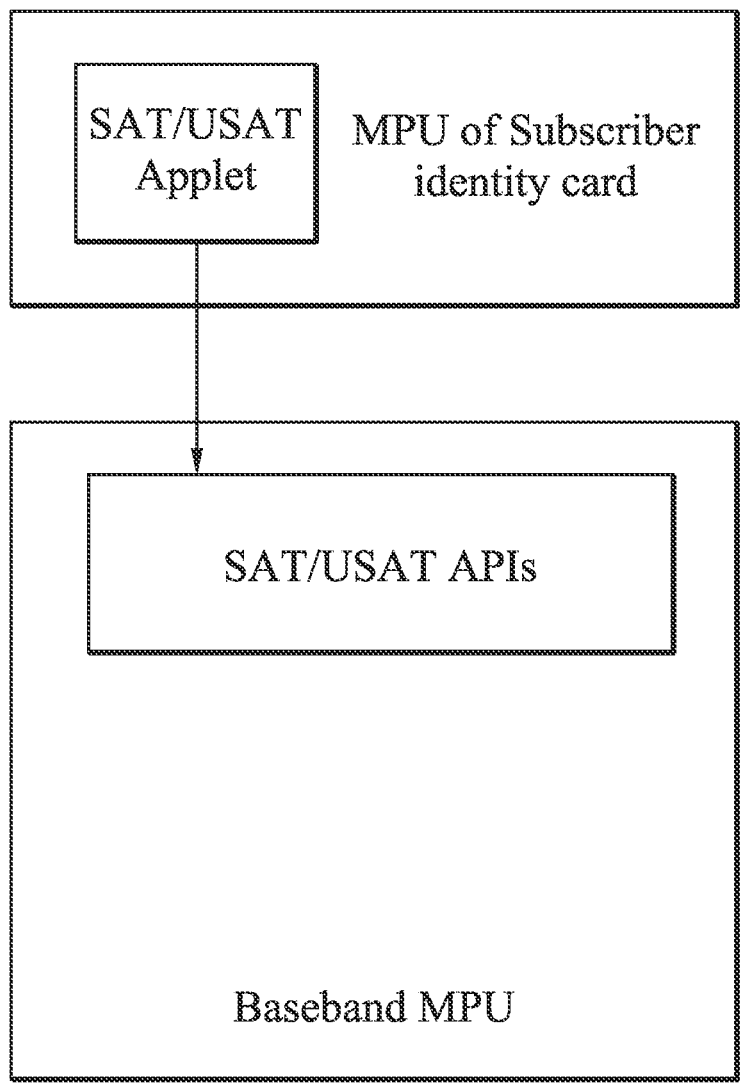
FIG. 1 shows a diagram illustrating applications in a form of an SAT/USAT applet, when executed by a SIM/USIM MPU, that request the mobile station to perform a particular task.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

A Subscriber Identity Module (SIM) card typically contains user account information, an International Mobile Subscriber Identity (IMSI) and a set of SIM Application Toolkit (SAT) commands, and provides storage space for phone book contacts. A Micro-Controlling Unit (MCU) or Micro-Processing Unit (MPU) of the Baseband chip (referred to as a Baseband MPU hereinafter) may interact with a MPU of a SIM card (referred to as a SIM MPU hereinafter) to fetch data or SAT commands from the plugged in SIM card. A communication device is immediately programmed after plugging in the SIM card. SIM cards may also be programmed to display custom menus for personalized services.

A Universal SIM (USIM) card is plugged into a communication device for Universal Mobile Telecommunications System (UMTS) (also called 3G) telephony communications. The USIM card stores user account information, an IMSI, authentication information and a set of USIM Application Toolkit (USAT) commands, and provides space for storing text messages and phone book contacts. A Baseband MPU may interact with an MCU of the USIM card (each referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS systems. A communication device is immediately programmed after plugging in the USIM card.

A Removable User Identity Module (R-UIM) or a Code Division Multiple Access (CDMA) Subscriber Identity Module (CSIM) card has been developed for a CDMA communication device and is equivalent to the GSM SIM and 3G USIM except that it is capable of working in CDMA networks. The R-UIM or the CSIM card is physically compatible with the GSM SIM card, and provides similar security mechanisms for the CDMA system.

A SIM Application Toolkit (SAT) is a standard of the GSM which enables an SIM MCU to initiate actions which can be used for various value-added services. The SAT consists of a set of commands programmed into a SIM card which define how the SIM MCU interacts directly with the outside world and initiates commands independently of the communication device and the network. The SAT enables the SIM MCU to build up an interactive exchange between a network application and an end user, and to access or control access to the network. The SIM MCU also provides SAT commands to the Baseband MPU to display a menu, ask for user input, or the similar. An SAT has been deployed by many network operators for many applications, often where a menu-based approach is required, such as mobile banking, content browsing, and switching between multiple subscriber numbers in a single subscriber identity card, etc. Designed as a single application environment, an SAT can be started at the initial power up of the SIM card and is especially suited to low level applications with simple user interfaces.

A USIM Application Toolkit (USAT) is the equivalent of an SAT for 3G networks. A USAT enables the USIM MCU to initiate actions which can be used for various value-added services delivered over the communication device. The USAT is employed in a multi-application environment of 3G devices and is not activated until a specific application has been selected, unlike SAT, which is activated at startup. Particularly, certain functions are card related rather than application related.

SAT and USAT proactive commands may be grouped into two categories: RF-dependent; and RF-independent. RF-dependent SAT/USAT proactive commands, when executed by the Baseband MPU, request for RF resources (i.e. an RF module), while RF-independent SAT/USAT proactive commands do not request for RF resources.

Exemplary RF-dependent SAT/USAT proactive commands are listed below.

SEND SHORT MESSAGE, which sends a short message or SMS-COMMAND to the network.

SEND SS, which sends a Supplementary Service (SS) request to the network.

SEND USSD, which sends an Unstructured Supplementary Service Data (USSD) string to the network.

SET UP CALL, of which there are three types:
set up a call, but only if not currently busy on another call;
set up a call, putting all other calls (if any) on hold;
set up a call, disconnecting all other calls (if any).

SEND DTMF, which requests the mobile station to send Dual-Tone Multi-Frequency (DTMF) tone(s) during an established call.

LAUNCH BROWSER, which requests a browser inside a browser-enabled mobile station to interpret the content corresponding to a universal resource locator (URL).

OPEN CHANNEL, which requests the mobile station to open a data channel with parameters indicated in the command (if class "e" is supported.)

CLOSE CHANNEL, which requests the mobile station to close the specified data channel (if class "e" is supported).

RECEIVE DATA, which requests the mobile station to return to the subscriber identity data (e.g. SIM, USIM, R-UIM or CSIM data) received on the specified channel (if class "e" is supported).

SEND DATA, which requests the mobile station to send on the specified channel data provided by the subscriber identity card, such as SIM, USIM, R-UIM or CSIM card, (if class "e" is supported).

GET CHANNEL STATUS, which requests the mobile station to return the current status of all available data channel(s) (if class "e" is supported).

Exemplary RF-independent SAT/USAT proactive commands are listed below.

DISPLAY TEXT, which displays text or an icon on screen.

GET INKEY, which sends text or an icon to the display and requests a single character response in return.

GET INPUT, which sends text or an icon to the display and requests a response in return.

MORE TIME, which does not request any action from the mobile station, wherein the mobile station is required to respond with TERMINAL RESPONSE (OK) as normal.

PLAY TONE, which requests the mobile station to play a tone in its earpiece, ringer, or other appropriate loudspeaker.

POLL INTERVAL, which negotiates how often the mobile station sends STATUS commands to the SIM during the idle mode.

REFRESH, which requests the mobile station to carry out a subscriber identity (e.g. SIM, USIM, R-UIM or CSIM) initialization, and/or advises the mobile station that the contents or structure of Elementary Files (EFs) on the subscriber identity card have been changed. The command also makes it possible to restart a card session by resetting the subscriber identity card.

SET UP MENU, where the subscriber identity card supplies a list of items to be incorporated into the mobile station's menu structure.

SELECT ITEM, where the subscriber identity card supplies a list of items and a user is expected to choose one.

PROVIDE LOCAL INFORMATION, which requests the mobile station to pass local information to the subscriber identity card, for example the mobile country and network codes (MCC+MNC) of the network on which a user is registered.

SET UP EVENT LIST, where the subscriber identity card supplies a list of events, wherein the mobile station provides details of when the events have occurred.

TIMER MANAGEMENT, which requests the mobile station to manage a timer in a way described in the command (start, deactivate and get the current value) and, in the case of starting a timer, for a duration indicated in the command.

SETUP IDLE MODE TEXT, which supplies a text string to be used by the mobile station as stand-by mode text.

RUN AT COMMAND, which conveys an AT Command to the mobile station, and causes the response to the AT Command to be returned to the subscriber identity card.

LANGUAGE NOTIFICATION, which allows the subscriber identity card to notify the mobile station about the language in text strings issued by the SAT/USAT application.

The SAT/USAT provides mechanisms which allow applications that are presented in a subscriber identity card to interact and operate with a communication device which supports the specific mechanism(s) required by the applications. Specifically, referring to FIG. 1, applications in a form of an SAT/USAT applet, when executed by a MCU of a subscriber identity card, requests the communication device (i.e. Baseband MPU/processor) to perform a particular task such as playing a tone, displaying text or menu on a screen, getting a user input, setting up a call, or others, by employing SAT/USAT application programming interfaces (API), also referred to as the mentioned SAT/USAT proactive commands. The subscriber identity card may be the mentioned SIM, USIM, R-UIM or CSIM card.

Figure 2:
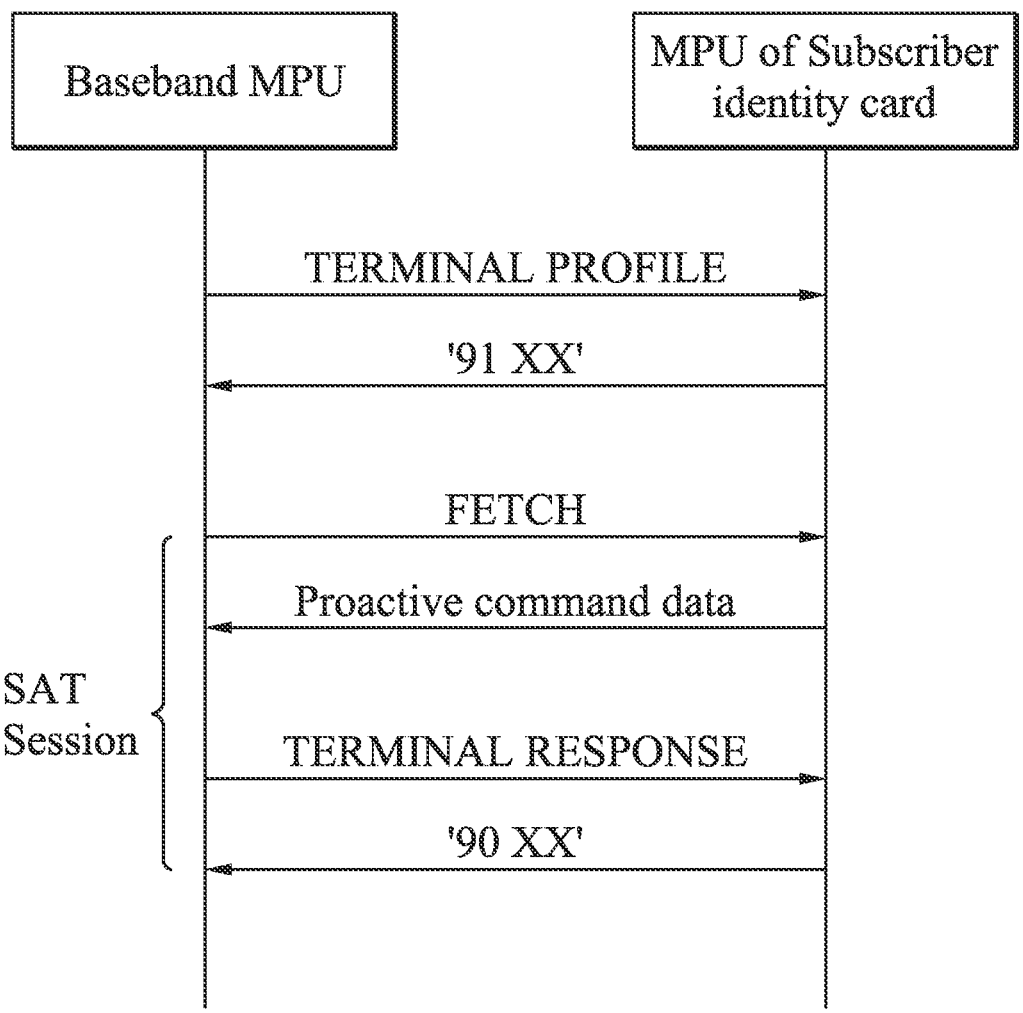
FIG. 2 shows a diagram illustrating an operation of a proactive command between the Baseband MPU and the SIM/USIM MPU.

Referring to FIG. 2, the Baseband MPU operates as a master and initiates commands to the MPU of the subscriber identity card. Note that SIM/USIM procedures may end in '90 00' (indicating normal ending to the initiated command), or may end in '91 XX' (indicating response data available from a subscriber identity card). The response code '91 XX' may also inform the Baseband MPU that the previous command has been successfully executed by the MPU of the subscriber identity card in the same way as '90 00' (i.e. "OK"), as well as, indicate response data which contains an SAT/USAT proactive command from the MPU of the subscriber identity card for a particular procedure. The value 'XX' indicates the length of the response data. After that, the Baseband MPU uses the FETCH command to obtain the response data indicating a particular SAT/USAT proactive command. If the indicated command has been successfully executed, the Baseband MPU informs the MPU of the subscriber identity card with "TERMINAL RESPONSE". If the indicated command is not successfully executed, the Baseband MPU informs the MPU of the subscriber identity card with "TERMINAL RESPONSE" with an error condition.

Figure 3A:
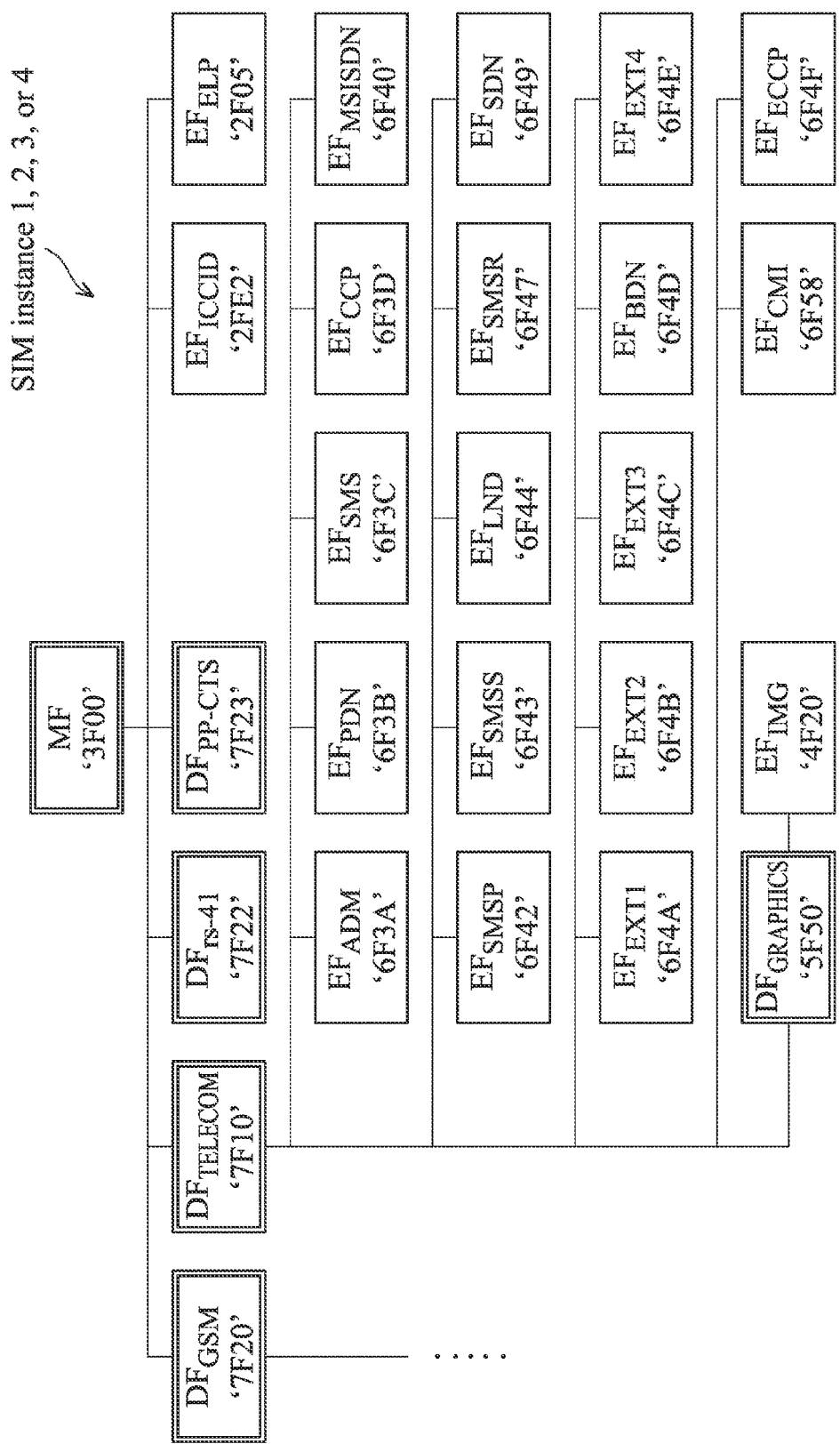
FIG. 3A shows an exemplary data format of one SIM instance for independently storing the data concerning a respective subscriber number according to an embodiment of the invention.
Figure 3B:
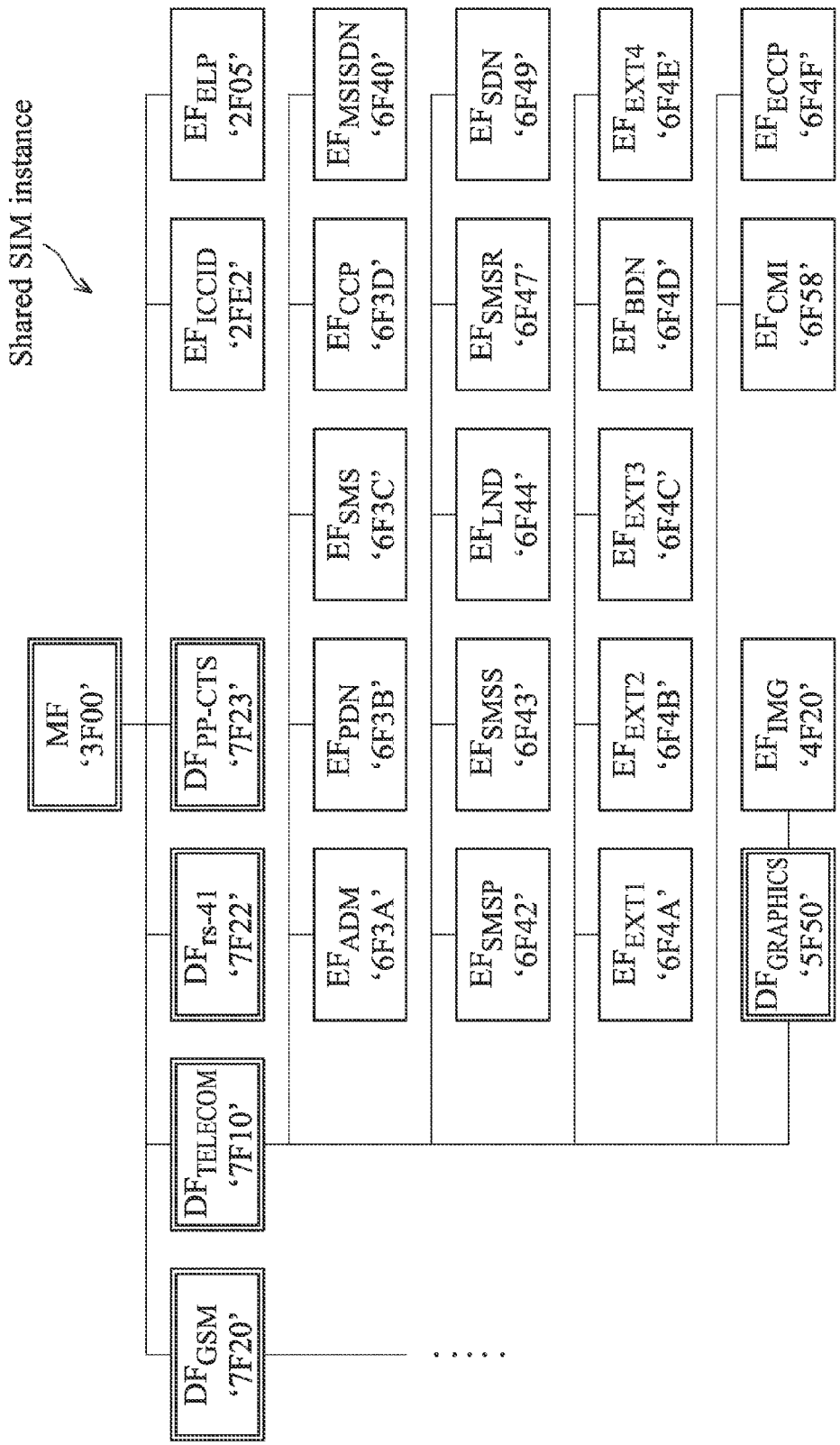
FIG. 3B shows an exemplary data format of a shared SIM instance for jointly storing the data concerning four subscriber numbers according to an embodiment of the invention.
Figure 3C:
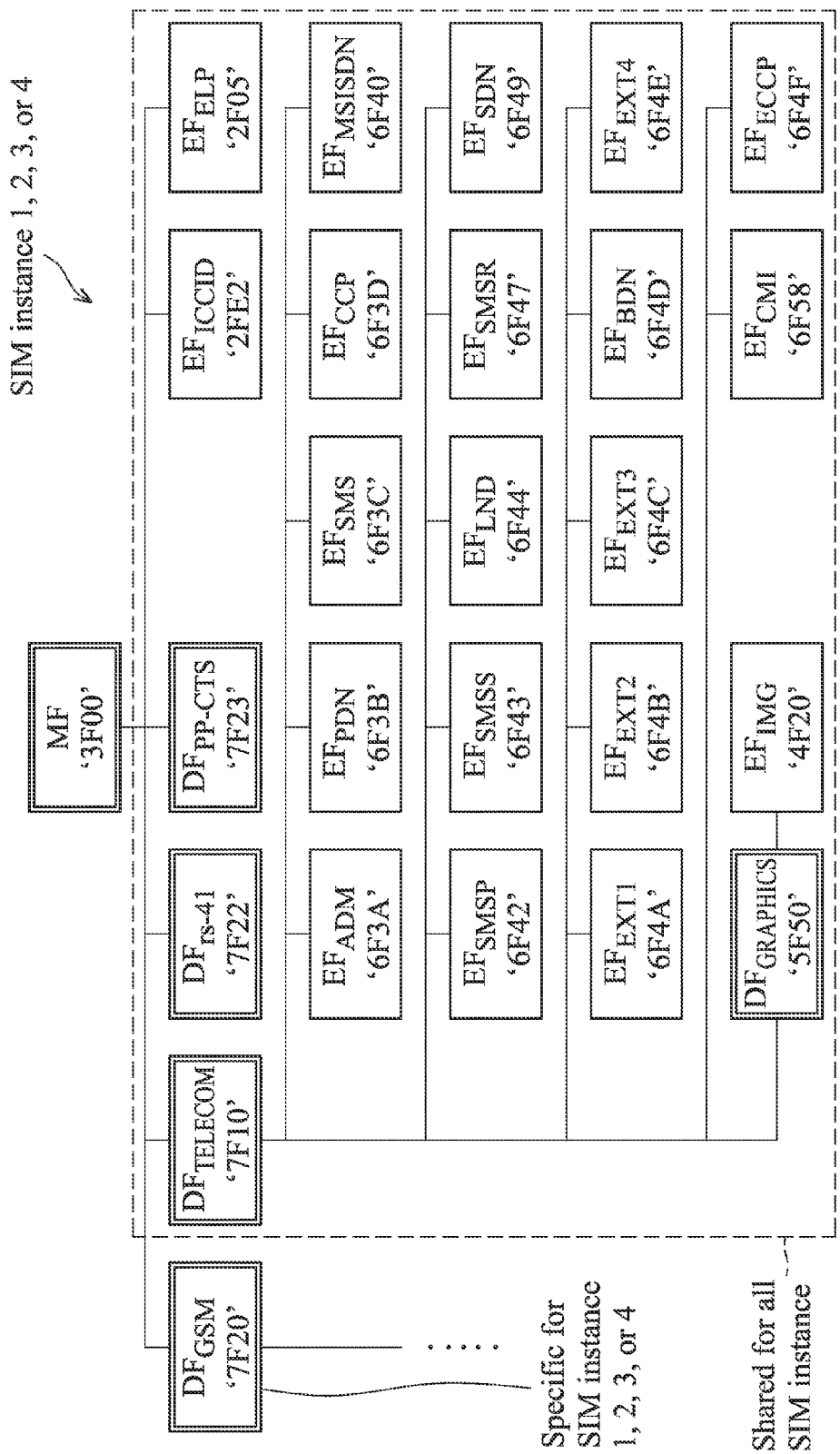
FIG. 3C shows an exemplary data format of a partly-independent SIM instance for storing the data concerning a respective subscriber number according to another embodiment of the invention.
Figure 4:
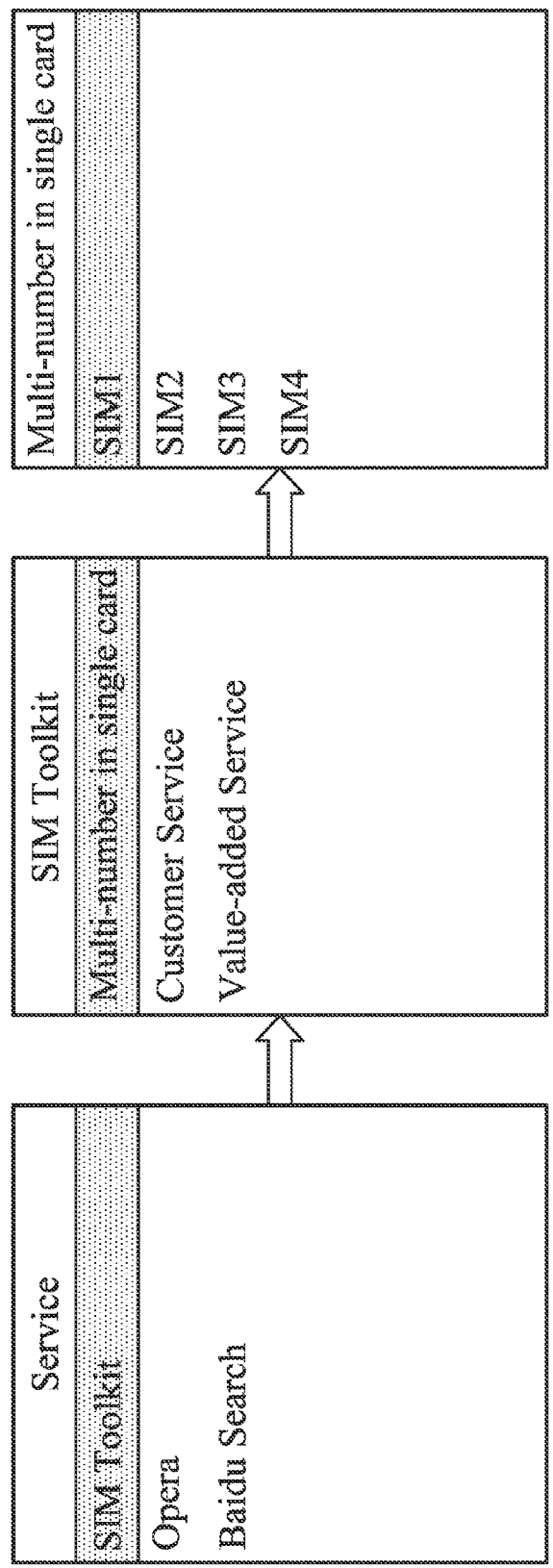
FIG. 4 shows an exemplary diagram of the provision of the number of SIM instances in a single subscriber identity card by an SAT menu tree according to an embodiment of the invention.

For a subscriber identity card having multiple subscriber numbers, a data format of a SIM instance may be deployed for independently storing the data concerning a respective subscriber number, as shown in FIG. 3A, or a shared data format for all SIM instances may be deployed for jointly storing the data concerning the multiple subscriber numbers, as shown in FIG. 3B. Alternatively, a partly-independent data format of one SIM instance may be deployed for storing the data concerning a respective subscriber number, in which most EFs are jointly used for storing the data concerning the subscriber numbers and only some other EFs are independently used for storing the data concerning respective subscriber numbers, as shown in FIG. 3C. Taking a single subscriber identity card having 4 subscriber numbers for example, if the data format as shown in FIG. 3A is employed, independent SIM instances are presented as four trees for storing the data concerning the 4 subscriber numbers, respectively; or if the data format as shown in FIG. 3B is employed, only a macro SIM instance is presented as one tree for storing the data concerning the 4 subscriber numbers, and data for 4 subscriber numbers is integrated into relevant nodes; or if the data format as shown in FIG. 3C is employed, 4 partly-independent SIM instances are presented for storing the unique data concerning the 4 subscriber numbers, such as data branching from the $DF_{GSM}$ being distinct from one SIM instance to another, and the EFs within the dotted rectangle are shared by all 4 SIM instances. In one embodiment, the amount of subscriber numbers in a subscriber identity card may be determined via a service menu provided by a SAT/USAT applet in the subscriber identity card, as shown in FIG. 4. In another embodiment, with the data formats in FIGS. 3A and 3C, the amount of subscriber numbers in a subscriber identity card may be determined according to the quantity of SIM instances therein, or in the data format in FIG. 3B, a proprietary EF may be used for storing the information of the amount of subscriber numbers in the subscriber identity card as follows:

TABLE 1

| Identifier: '6F01' | Structure: transparent | Optional |
| --- | --- | --- |
| File size: 1 byte | | Update activity: low |

| Access Conditions: | |
| --- | --- |
| READ | CHV1 |
| UPDATE | ADM |
| INVALIDATE | ADM |
| REHABILITATE | ADM |

| Bytes | Description | M/O | Length |
| --- | --- | --- | --- |
| 1 | Number of SIM instances | M | 1 byte |

Accordingly, the proprietary EF may be read for determining a total number of subscriber numbers in the subscriber identity card. It is to be understood that the proprietary EF as shown in Table. 1 may also be deployed in the data formats in FIGS. 3A and 3C, and the invention is not limited thereto. In yet another embodiment, it may be configured such that the information of the number of subscriber numbers in the subscriber identity card is carried in one of the unused fields of response data corresponding to a read attempt of the Master File (MF).

Figure 5:
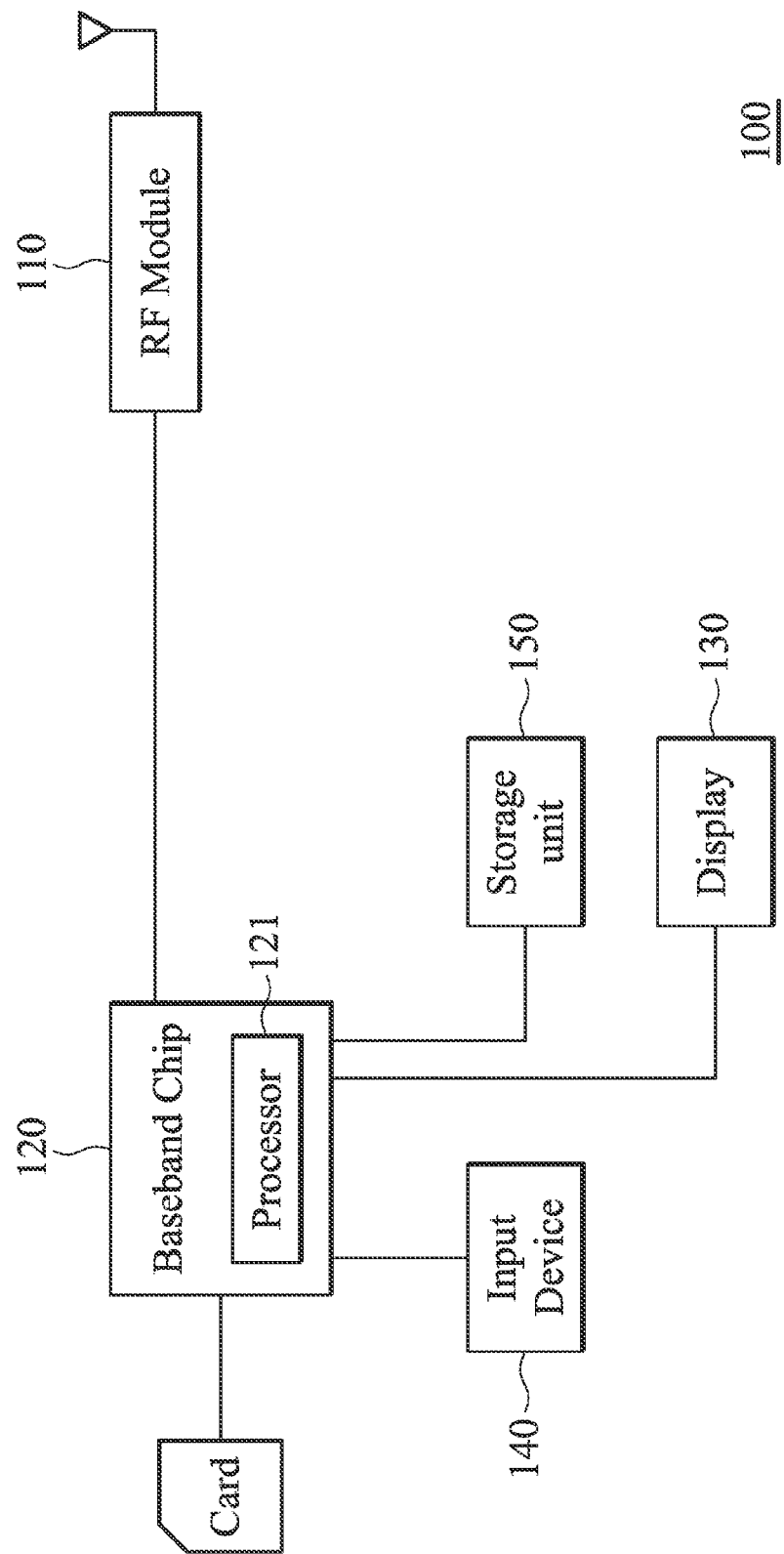
FIG. 5 shows a hardware architecture of a communication device according to an embodiment of the invention.

FIG. 5 shows a hardware architecture of a communication device according to an embodiment of the invention. The communication device 100 comprises a Radio Frequency (RF) module 110, a Baseband chip 120, a display 130, an input device 140, and a storage unit 150, wherein the RF module 110, the display 130, the input device 140, and the storage unit 150 are coupled to the Baseband chip 120. The Baseband chip 120 comprises a processor 121 for controlling the communications between a subscriber identity card and the RF module 110, sending a series of frame data (e.g. representing text messages, graphics, images or others) to the display 130, receiving signals from the input device 140, and storing and retrieving data to and from the storage unit 150. Additionally, the Baseband chip 120 may further contain other hardware components to perform baseband signal processing, including analog to digital conversion (ADC)/digital to analog conversion (DAC), gain adjusting, modulation/demodulation, encoding/decoding, and so on. The RF module 110 may receive RF wireless signals, convert the received RF wireless signals to baseband signals, which are processed by the Baseband chip 120, or receive baseband signals from the Baseband chip 120 and convert the received baseband signals to RF wireless signals, which are later transmitted. The RF module 110 may also contain multiple hardware devices to perform radio frequency conversion. For example, the RF module 110 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. The subscriber identity card may be plugged into a socket of the communication device 100, which is connected to the Baseband chip 120. The subscriber identity card may be a SIM, USIM, R-UIM or CSIM card, which is provided by a particular network operator. The storage unit 150 may be a memory, such as a FLASH memory or a Non-volatile Random Access Memory (NVRAM), or a magnetic storage device, such as a hard disk or a magnetic tape, or an optical disc, which is used for storing communication data for the Baseband chip 120 and/or storing subscriber data read from the subscriber identity card.

Figure 6:
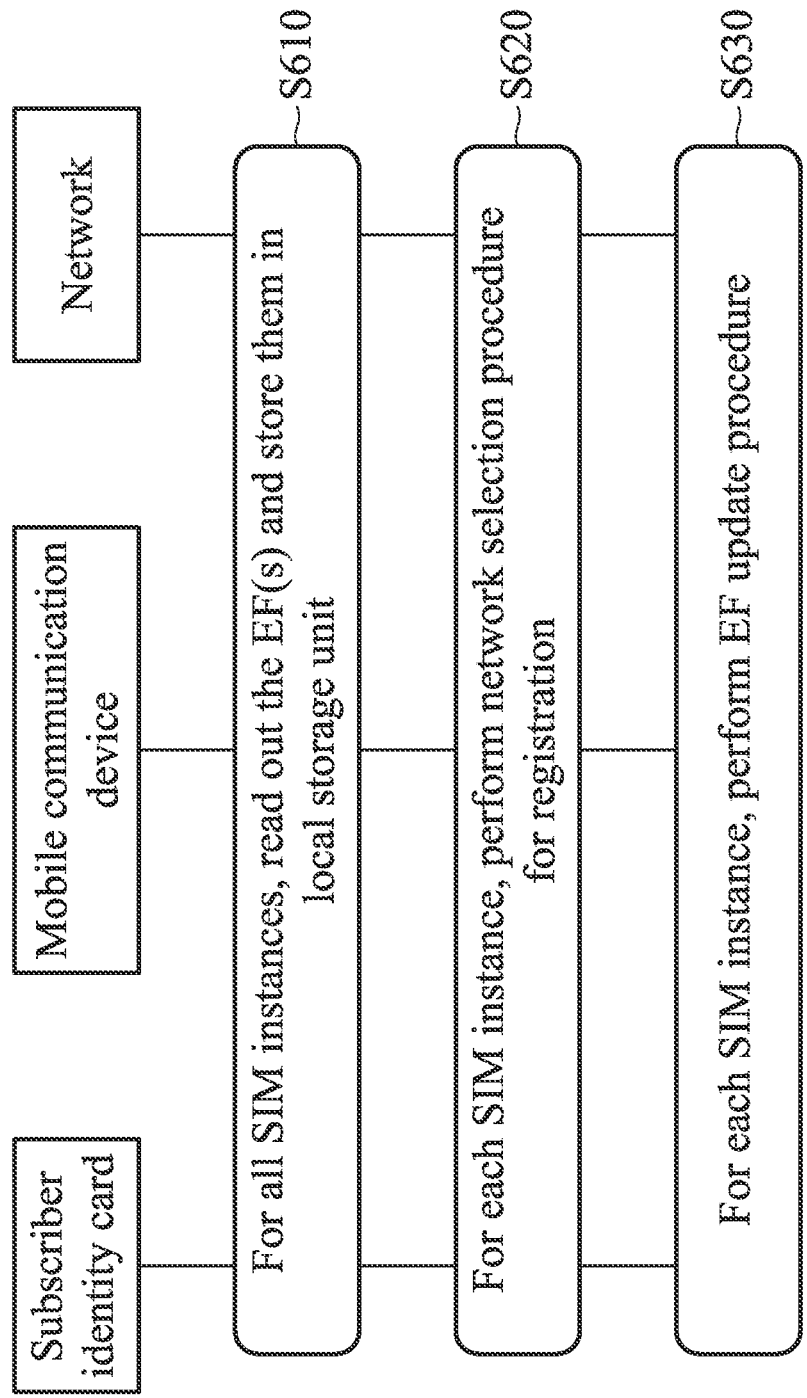
FIG. 6 is a high level message sequence chart illustrating the provision of a multi-standby mode of wireless communications in a communication device with a single subscriber identity card comprising a plurality of subscriber numbers according to an embodiment of the invention.

FIG. 6 is a high level message sequence chart illustrating the provision of a multi-standby mode of wireless communications in a communication device with a single subscriber identity card comprising a plurality of subscriber numbers according to an embodiment of the invention. At power on, the MPU of a Baseband chip in the communication device performs a series of refresh procedures to read all relevant EFs of each of the SIM instances in the subscriber identity card (step S610), wherein each of the SIM instances is corresponding to a respective subscriber number. After the refresh procedures are completed, the MPU of the Baseband chip in the communication device performs a series of network selection procedures to register itself to different networks for each of the SIM instances in the subscriber identity card (step S620). For the case where some EFs may be updated during the registration processes of the network selection procedures, the MPU of the Baseband chip in the communication device performs a series of EF update procedures to write the updated EFs back to the subscriber identity card for each of the SIM instances (step S630). Note that, the step S630 may be omitted if no EF needs to be updated during the registration processes of the network selection procedures. For the refresh procedures, the network selection procedures, and the EF update procedures, detailed operations will be given in the following descriptions.

Figure 7:
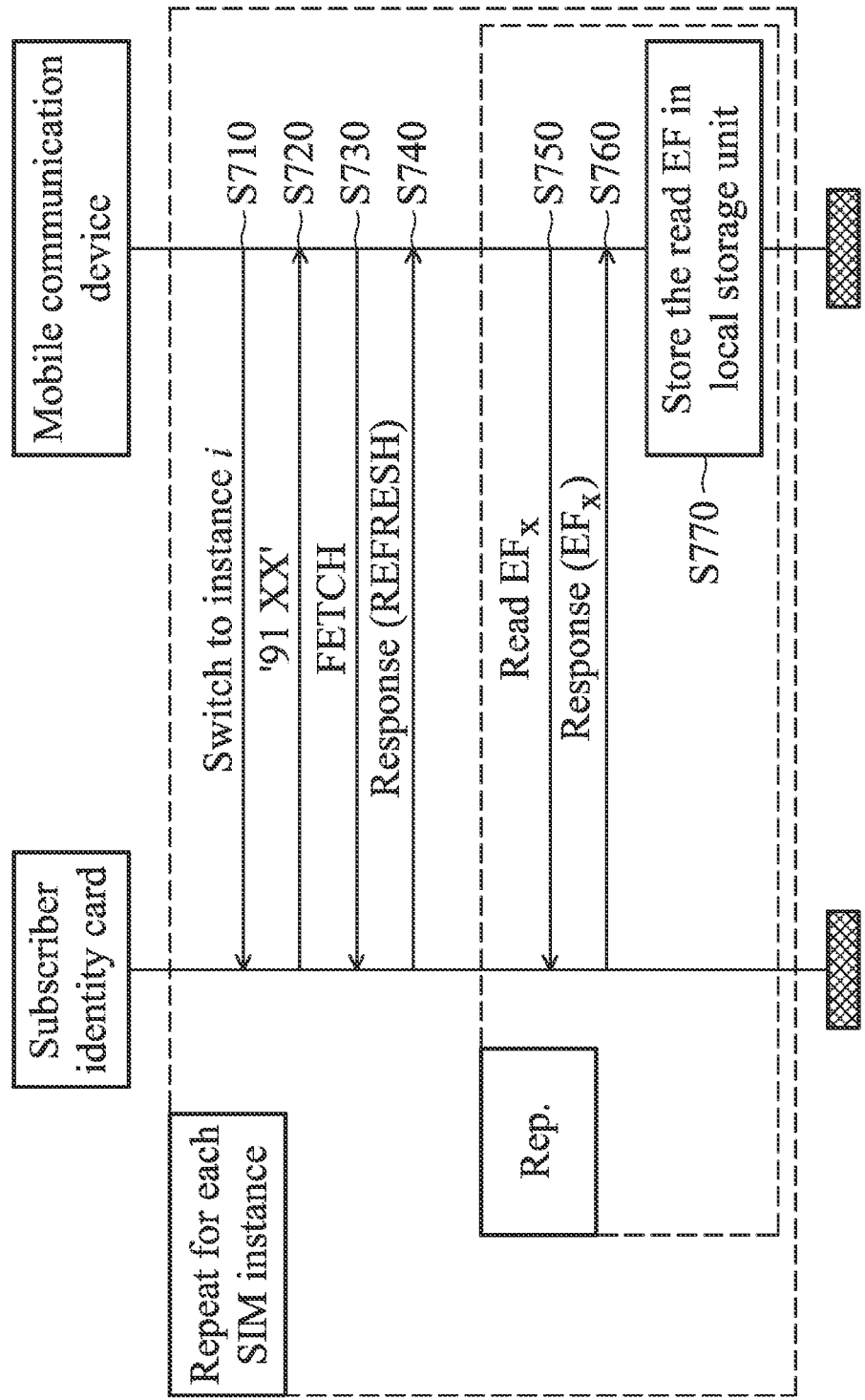
FIG. 7 is a message sequence chart illustrating a refresh procedure according to an embodiment of the invention.

FIG. 7 is a message sequence chart illustrating a refresh procedure according to an embodiment of the invention. As shown in FIG. 7, the refresh procedure starts by the MPU of the Baseband chip in the communication device to transmit a SAT/USAT proactive command to request the subscriber identity card to switch the activated SIM instance to the first SIM instance (step S710). In one embodiment, the transmission of the SAT/USAT proactive command may be triggered by a user input indicating that the first SIM instance is selected via the SAT menu as shown in FIG. 4. In another embodiment, the SAT/USAT proactive command may perform writing of a specific value into a particular EF, so that the MPU of the subscriber identity card may acknowledge the need to switch the activated SIM instance to the first SIM instance in response to detecting the updated value of the particular EF being the specific value. When receiving the SAT/USAT proactive command, the MPU of the subscriber identity card replies to the communication device with a response code '91 XX' which indicates availability of a response data to be fetched (step S720). Next, the MPU of the Baseband chip in the communication device transmits a FETCH command to obtain the response data (step S730). In response to receiving the response data with a REFRESH command (step S740), the MPU of the Baseband chip in the communication device requests to read an EF from the subscriber identity card (step S750) and then receives the requested EF from the subscriber identity card (step S760). The MPU of the Baseband chip in the communication device then stores the read EF in a local storage unit (step S770). The local storage unit may represent a memory of the Baseband chip, i.e. memory-in-chip. The local storage unit may represent a memory outside of the Baseband chip, e.g. 150 of FIG. 5. Note that, the steps S750 to S770 may be repeated until all relevant EFs of the activated SIM instance (i.e., all EFs associated with a subscriber number corresponding to the activated SIM instance) are read. After all EFs of the first SIM instance are read, the refresh procedure is repeated for the next SIM instance in the subscriber identity card, until all EFs of all SIM instances in the subscriber identity card are read.

For the refresh procedure described in FIG. 7, some exemplary EFs to be read from a SIM card are listed below.

$EF_{IMSI}$, which contains an IMSI associated with a subscriber number in the SIM card.

$EF_{Phase}$, which contains information concerning the phase of the SIM card $EF_{AD}$, which contains information concerning the mode of operation according to the type of the SIM card, such as "normal" (to be used by Public Land Mobile Network (PLMN) subscribers for GSM operations), "type approval" (to allow specific use of the mobile equipment (ME) during type approval procedures of, e.g., the radio equipment), "cell testing" (to allow testing of a cell before commercial use of this cell), "manufacturer specific" (to allow the ME manufacturer to perform specific proprietary auto-tests in its ME during, e.g., maintenance phases).

$EF_{ACC}$, which contains the assigned access control class (es).

$EF_{LOCI}$, which contains the location information, such as the Temporary Mobile Subscriber Identity (TMSI), the Location Area Information (LAI), the TMSI TIME, and the location update status.

$EF_{LOCIGPRS}$, which contains the location information, such as the Packet Temporary Mobile Subscriber Identity (P-TMSI), the P-TMSI signature value, the Routing Area Information (RAI), and the routing area update status.

$EF_{BCCH}$, which contains information concerning the Broadcast Control Channel (BCCH).

$EF_{PLMNsel}$, which contains coding for n PLMNs, where n is at least eight, and the information determined by the user/operator defines the preferred PLMNs of the user in priority order.

$EF_{OPLMNwAcT}$, which contains coding for n PLMNs and the access technologies for the PLMNs, where n is at least eight, and the coding information, determined by the network operator, defines the preferred PLMNs of the network operator in priority order.

$EF_{HPLMN}$, which contains the interval of time between searches for the Home PLMN (HPLMN).

$EF_{FPLMN}$, which contains the coding for four Forbidden PLMNs (FPLMN).

For the refresh procedure described in FIG. 7, some exemplary EFs to be read from a USIM card are listed below.

$EF_{IMSI}$, which contains an IMSI associated with a subscriber number in the SIM card.

$EF_{AD}$, which contains information concerning the mode of operation according to the type of the SIM card, such as "normal" (to be used by Public Land Mobile Network (PLMN) subscribers for GSM operations), "type approval" (to allow specific use of the ME during type approval procedures of, e.g., the radio equipment), "cell testing" (to allow testing of a cell before commercial use of this cell), "manufacturer specific" (to allow the ME manufacturer to perform specific proprietary auto-tests in its ME during, e.g., maintenance phases).

$EF_{ACC}$, which contains the assigned access control class (es).

$EF_{LOCI}$, which contains the location information, such as the Temporary Mobile Subscriber Identity (TMSI), the Location Area Information (LAI), the TMSI TIME, and the location update status.

$EF_{PSLOCI}$, which contains the location information, such as the Packet Temporary Mobile Subscriber Identity (P-TMSI), the P-TMSI signature value, the Routing Area Information (RAI), and the routing area update status.

$EF_{NETPAR}$, which contains information concerning the cell frequencies.

$EF_{START-HFN}$, which contains the value of $START_{CS}$ and $START_{PS}$ of the bearers that were protected by the keys in $EF_{KEYS}$ or $EF_{KEYSPS}$ at release of the last Circuit-Switched (CS) or Packet-Switched (PS) Radio Resource Control (RRC) connection.

$EF_{THRESHOLD}$, which contains the value of $START_{CS}$ and $START_{PS}$, and is used to control the lifetime of the keys.

$EF_{PLMNsel}$, which contains coding for n PLMNs, where n is at least eight, and the information determined by the user/operator defines the preferred PLMNs of the user in priority order.

$EF_{OPLMNwAcT}$, which contains coding for n PLMNs and the access technologies for the PLMNs, where n is at least eight, and the coding information, determined by the network operator, defines the preferred PLMNs of the network operator in priority order.

$EF_{HPLMN}$, which contains the interval of time between searches for the Home PLMN (HPLMN).

$EF_{FPLMN}$, which contains the coding for four Forbidden PLMNs (FPLMN).

$EF_{EHPLMN}$, which contains the coding for n Equivalent HPLMNs (EHPLMNs), wherein the coding information may contain the HPLMN code derived from the IMSI as an EHPLMN entry.

Figure 8A:
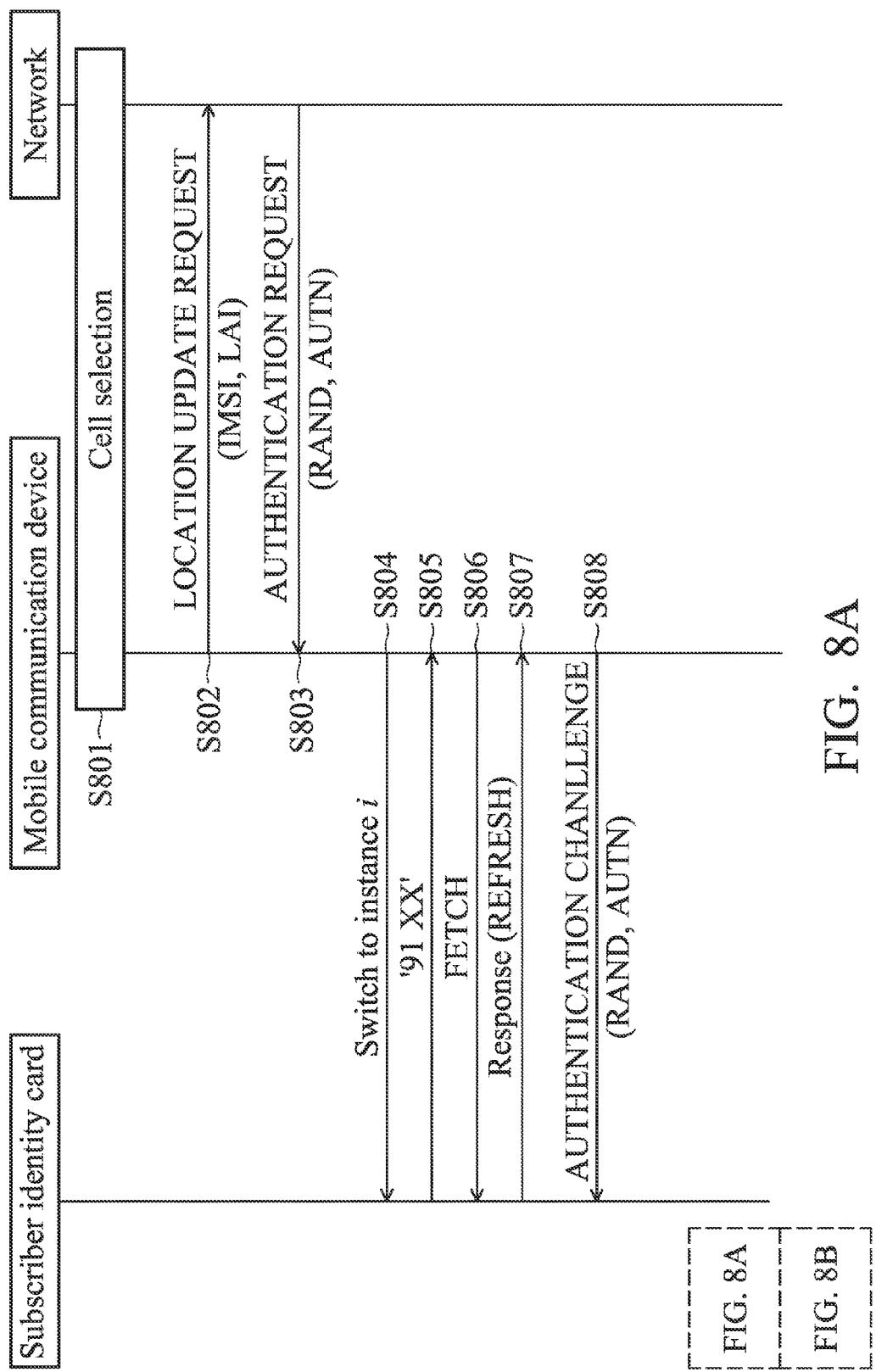
FIGS. 8A and 8B show a message sequence chart of a network selection procedure with a WCDMA network according to an embodiment of the invention.
Figure 8B:
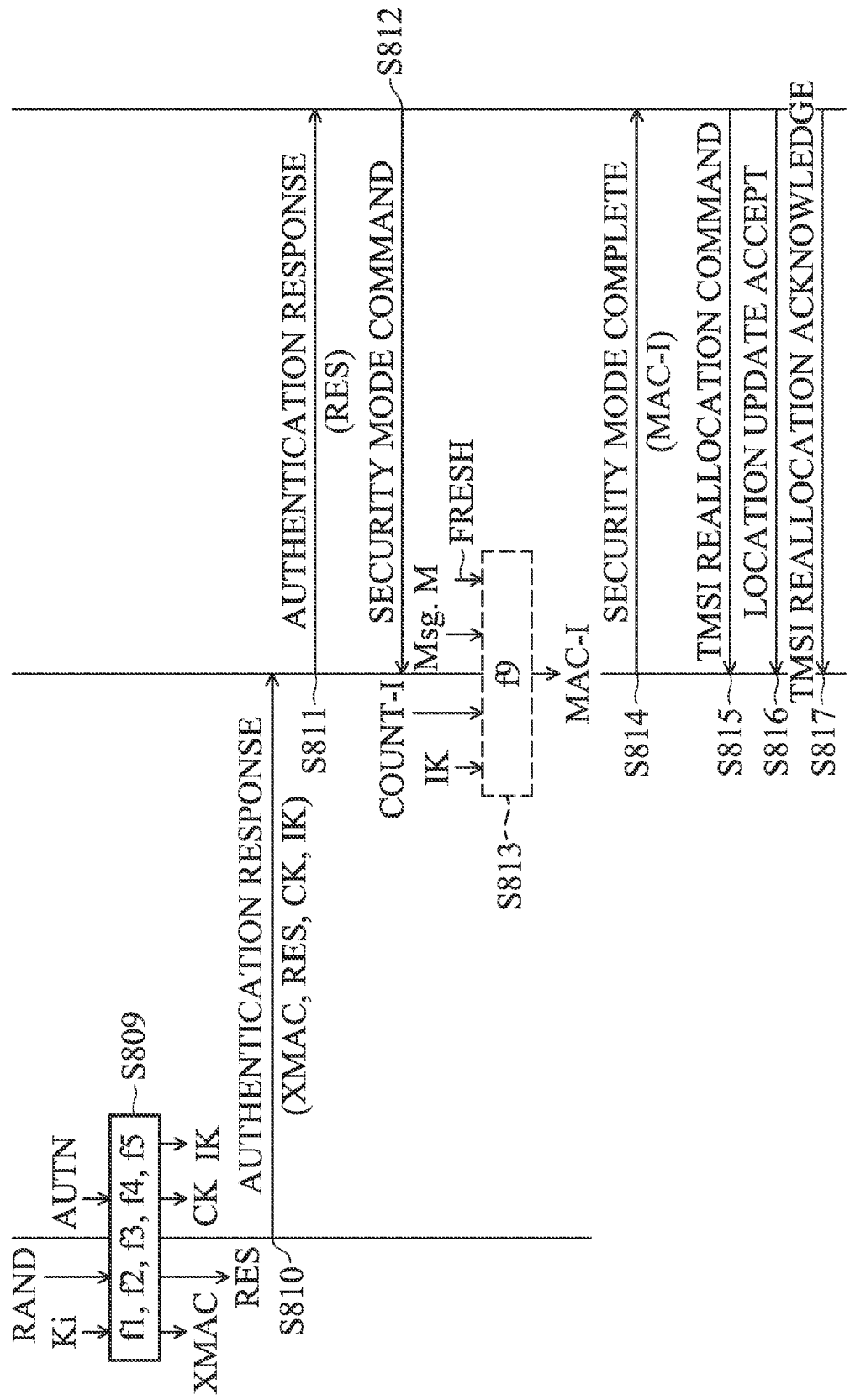

FIGS. 8A and 8B show a message sequence chart of a network selection procedure with a WCDMA network according to an embodiment of the invention. As shown in FIGS. 8A and 8B, the network selection procedure starts by the communication device to perform cell selection to camp on a cell of a network according to the first SIM instance in the subscriber identity card (step S801). Particularly, the first SIM instance is corresponding to a subscriber number for the WCDMA technology. When the communication device successfully camps on a cell, it attempts to register itself to the network which the cell it camps on belongs to. Specifically, the communication device transmits to the network a LOCATION UPDATE REQUEST message containing the IMSI associated with the first SIM instance and the LAI of the cell which it camps on (step S802). In response to the LOCATION UPDATE REQUEST message, the network initiates an authentication process by transmitting to the communication device an AUTHENTICATION REQUEST message containing a random part RAND and an authentication part AUTN for authenticating the network to the communication device (step S803). In order to perform the authentication of the network, the MPU of the Baseband chip in the communication device needs to request the subscriber identity card to run the authentication algorithm associated with the first SIM instance therein. In this embodiment, due to the fact that the authentication algorithms respectively associated with the SIM instances in the subscriber identity card are different from each other, the MPU of the Baseband chip in the communication device transmits a SAT/USAT proactive command to request the subscriber identity card to switch the activated SIM instance to the first SIM instance (step S804). In one embodiment, the SAT/USAT proactive command may perform writing of a specific value into a particular EF, so that the MPU of the subscriber identity card may acknowledge the need to switch the activated SIM instance to the first SIM instance in response to detecting the updated value of the particular EF being the specific value. When receiving the SAT/USAT proactive command, the MPU of the subscriber identity card replies to the communication device with a response code '91 XX' which indicates availability of a response data to be fetched (step S805). Next, the MPU of the Baseband chip in the communication device transmits a FETCH command to obtain the response data (step S806). When receiving the response data, the MPU of the Baseband chip in the communication device determines that the response data indicates a REFRESH command (step S807), i.e., the activate SIM instance has been switched to the first SIM instance.

After that, the MPU of the Baseband chip in the communication device transmits to the subscriber identity card an AUTHENTICATION CHALLENGE message containing the random part RAND and the authentication part AUTN (step S808). With the random part RAND and the authentication part AUTN, the MPU of the subscriber identity card runs the authentication algorithm associated with the first SIM instance and generates an authentication vector which includes authentication parameters such as XMAC, RES, CK, and IK (step S809). Specifically, the authentication algorithm is a combination of the f1, f2, f3, f4, and f5 algorithm defined in the release 10 of the 3GPP TS 35.205 and 35.206 specifications, v.10.0.0 (referred to herein as the TS 35.205 and 35.206 specifications). The subscriber identity card then replies to the communication device with an AUTHENTICATION RESPONSE message containing the generated authentication vector (step S810). Then, the communication device transmits to the network another AUTHENTICATION RESPONSE message containing the authentication parameter RES (step S811). When receiving the AUTHENTICATION RESPONSE message, the network further transmits a SECURITY MODE COMMAND message to the communication device (step S812), to start the integrity protection of the subsequent messages. Upon receiving the SECURITY MODE COMMAND message, the MPU of the Baseband chip in the communication device runs the integrity algorithm f9 defined in the release 10 of the 3GPP TS 35.201 and 35.202 specifications, v.10.0.0 (referred to herein as the TS 35.201 and 35.202 specifications) to calculate a 32-bit message authentication code MAC-I (step S813). After the calculation of the message authentication code MAC-I, the communication device replies to the network with a SECURITY MODE COMPLETE message containing the message authentication code MAC-I (step S814). The network determines whether the message authentication code MAC-I is authenticated and decides to accept the registration of the communication device when the MAC-I is successfully authenticated. Upon accepting the registration of the communication device, the network further transmits a TMSI REALLOCATION COMMAND message to re-allocate the TMSI to the communication device (step S815), and transmits a LOCATION UPDATE ACCEPT message to the communication device (step S816). The communication device replies to the network with a TMSI REALLOCATION ACKNOWLEDGE message for acknowledging the reception of the TMSI REALLOCATION COMMAND message (step S817). The registration to the network according to the first SIM instance ends with the communication device receiving the LOCATION UPDATE ACCEPT message, and the network selection procedure may be repeated for the next SIM instance in the subscriber identity card, until registrations to the networks according to each of the SIM instances in the subscriber identity card have been completed. Thus, the communication device simultaneously camps on multiple cells provided by the same or different networks, i.e., the communication device operates in a multi-standby mode using the multiple subscriber numbers in the subscriber identity card. Note that, the steps S804 to S807 may be omitted for the cases where the authentication algorithms respectively associated with the SIM instances in the subscriber identity card are the same or the authentication algorithms associated with the last activated SIM instance and the currently activated SIM instance are the same. Other detailed descriptions of the network selection procedure are omitted herein since they are beyond the scope of the invention, and references may be made to the release 10 of the 3GPP TS 23.122 specification, v.10.3.0 (referred to herein as the TS 23.122 specification), release 10 of the 3GPP TS 43.022 specification, v.10.0.0 (referred to herein as the TS 43.022 specification), release 10 of the 3GPP TS 25.304 specification, v.10.0.0 (referred to herein as the TS 25.304 specification), and release 10 of the 3GPP TS 36.304 specification, v.10.1.0 (referred to herein as the TS 36.304 specification).

Figure 9A:
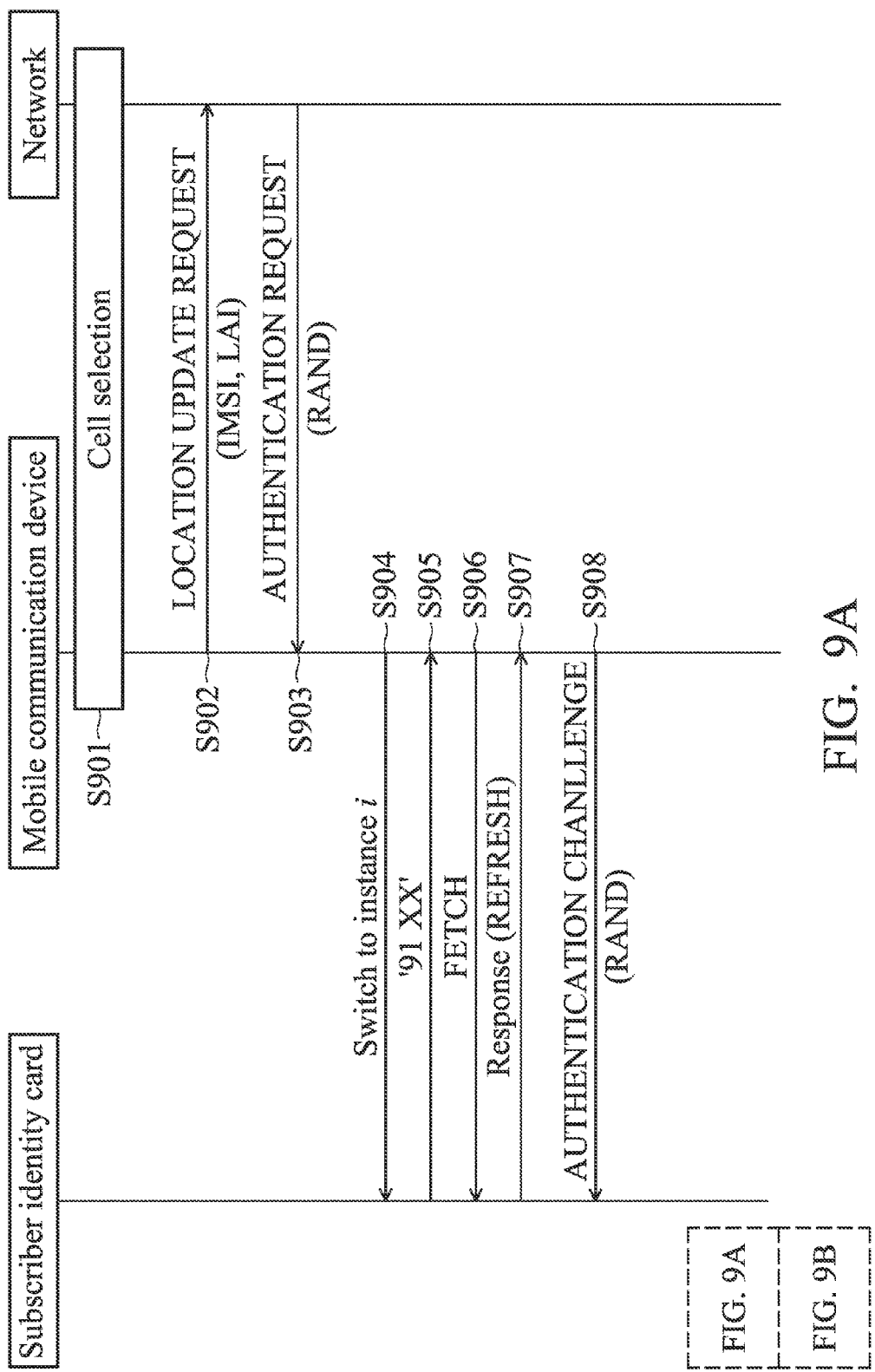
FIGS. 9A and 9B show a message sequence chart of a network selection procedure with a GSM/GPRS/EDGE network according to another embodiment of the invention.
Figure 9B:
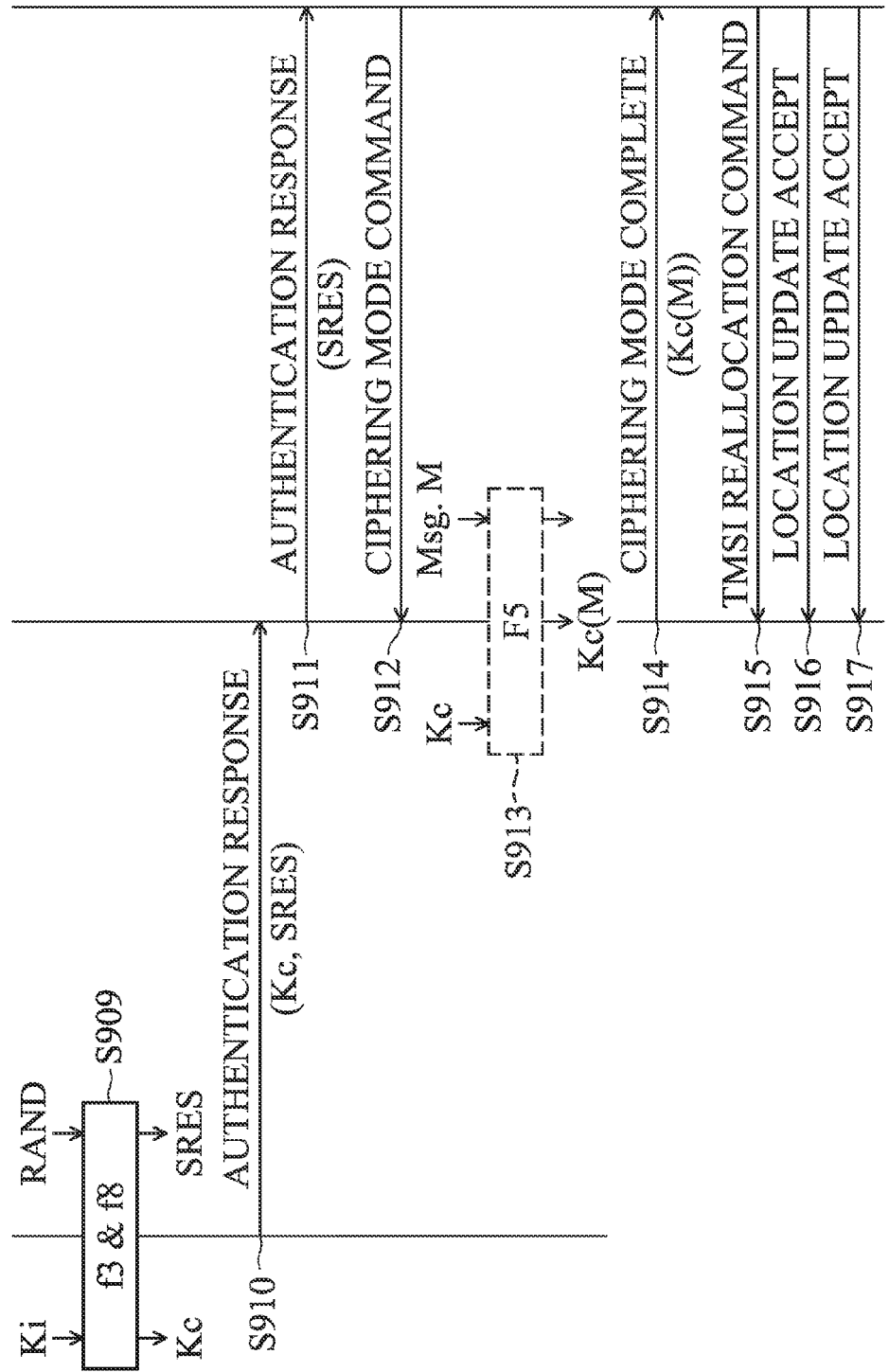

FIGS. 9A and 9B show a message sequence chart of a network selection procedure with a GSM/GPRS/EDGE network according to another embodiment of the invention. As shown in FIGS. 9A and 9B, the network selection procedure starts by the communication device to perform cell selection to camp on a cell of a network according to the first SIM instance in the subscriber identity card (step S901). Particularly, the first SIM instance is corresponding to a subscriber number for the GSM, GPRS, or EDGE technology. When the communication device successfully camps on a cell, it attempts to register itself to the network which the cell it camps on belongs to. Specifically, the communication device transmits to the network a LOCATION UPDATE REQUEST message containing the IMSI associated with the first SIM instance and the LAI of the cell which it camps on (step S902). In response to the LOCATION UPDATE REQUEST message, the network initiates an authentication process by transmitting to the communication device an AUTHENTICATION REQUEST message containing a random part RAND for authenticating the network to the communication device (step S903). In order to perform the authentication of the network, the MPU of the Baseband chip in the communication device needs to request the subscriber identity card to run the authentication algorithm associated with the first SIM instance therein. In this embodiment, due to the fact that the authentication algorithms respectively associated with the SIM instances in the subscriber identity card are different from each other, the MPU of the Baseband chip in the communication device transmits a SAT/USAT proactive command to request the subscriber identity card to switch the activated SIM instance to the first SIM instance (step S904). In one embodiment, the SAT/USAT proactive command may perform writing of a specific value into a particular EF, so that the MPU of the subscriber identity card may acknowledge the need to switch the activated SIM instance to the first SIM instance in response to detecting the updated value of the particular EF being the specific value. When receiving the SAT/USAT proactive command, the MPU of the subscriber identity card replies to the communication device with a response code '91 XX' which indicates availability of a response data to be fetched (step S905). Next, the MPU of the Baseband chip in the communication device transmits a FETCH command to obtain the response data (step S906). When receiving the response data, the MPU of the Baseband chip in the communication device determines that the response data indicates a REFRESH command (step S907), i.e., the activate SIM instance has been switched to the first SIM instance.

After that, the MPU of the Baseband chip in the communication device transmits to the subscriber identity card an AUTHENTICATION CHALLENGE message containing the random part RAND (step S908). With the random part RAND, the MPU of the subscriber identity card runs the authentication algorithm associated with the first SIM instance and generates an authentication vector which includes authentication parameters such as Kc and SRES (step S909). Specifically, the authentication algorithm is a combination of the A3 and A8 algorithm defined in the release 10 of the 3GPP TS 55.205 specification, v.10.0.0 (referred to herein as the TS 55.205 specification). The subscriber identity card then replies to the communication device with an AUTHENTICATION RESPONSE message containing the generated authentication vector (step S910). Then, the communication device transmits to the network another AUTHENTICATION RESPONSE message containing the authentication parameter SRES (step S911). When receiving the AUTHENTICATION RESPONSE message, the network further transmits a CIPHERING MODE COMMAND message to the communication device (step S912), to start the ciphering for subsequent messages. Upon receiving the CIPHERING MODE COMMAND message, the MPU of the Baseband chip in the communication device runs the ciphering algorithm A5 defined in the release 10 of the 3GPP TS 55.216 specifications, v.10.0.0 (referred to herein as the TS 55.216 specification) to cipher the CIPHERING MODE COMMAND message and generate a ciphered message Kc(M) (step S913). After the generation of the ciphered message Kc(M), the communication device replies to the network with a CIPHERING MODE COMPLETE message containing the ciphered message Kc(M) (step S914). The network determines whether the ciphered message Kc(M) is authenticated and decides to accept the registration of the communication device when the Kc(M) is successfully authenticated. Upon accepting the registration of the communication device, the network further transmits a TMSI REALLOCATION COMMAND message to re-allocate the TMSI to the communication device (step S915), and transmits a LOCATION UPDATE ACCEPT message to the communication device (step S916). The communication device replies to the network with a TMSI REALLOCATION ACKNOWLEDGE message for acknowledging the reception of the TMSI REALLOCATION COMMAND message (step S917). The registration to the network according to the first SIM instance ends with the communication device receiving the LOCATION UPDATE ACCEPT message, and the network selection procedure may be repeated for the next SIM instance in the subscriber identity card, until registrations to the networks according to each of the SIM instances in the subscriber identity card have been completed. Thus, the communication device simultaneously camps on multiple cells provided by the same or different networks, i.e., the communication device operates in a multi-standby mode using the multiple subscriber numbers in the subscriber identity card. Note that, the steps S904 to S907 may be omitted for the cases where the authentication algorithms respectively associated with the SIM instances in the subscriber identity card are the same or the authentication algorithms associated with the last activated SIM instance and the currently activated SIM instance are the same. Other detailed descriptions of the network selection procedure are omitted herein since they are beyond the scope of the invention, and references may be made to TS 23.122, 43.022, 25.304, and 36.304 specifications.

Figure 10:
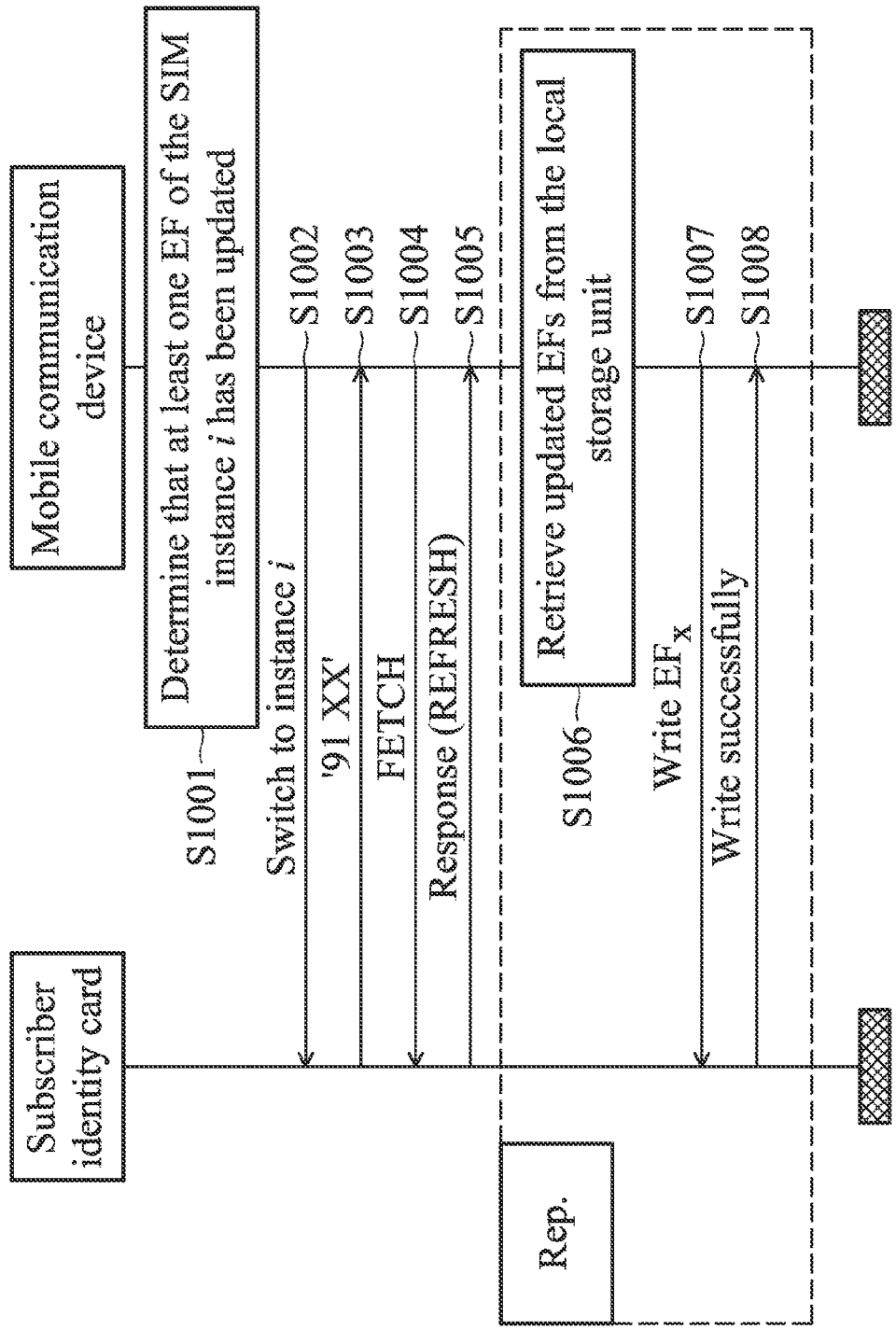
FIG. 10 is a message sequence chart illustrating an EF update procedure according to another embodiment of the invention.

FIG. 10 is a message sequence chart illustrating an EF update procedure according to another embodiment of the invention. The EF update procedure is initiated by the MPU of the Baseband chip in the communication device, if one or more EFs are updated during the registration processes of the network selection procedures. Specifically, the MPU of the Baseband chip may write the updated EFs in the local storage unit in the communication device, and then write the updated EFs back to the subscriber identity card later in response to some special events, such as the completion of a detachment procedure or the power-off of the communication device. As shown in FIG. 10, the EF update procedure starts by the MPU of the Baseband chip in the communication device to determine whether any EF of the first SIM instance has been updated (step S1001). If so, the MPU of the Baseband chip in the communication device transmits a SAT/USAT proactive command to request the subscriber identity card to switch the activated SIM instance to the first SIM instance (step S1002). In one embodiment, the SAT/USAT proactive command may perform writing of a specific value into a particular EF, so that the MPU of the subscriber identity card may acknowledge the need to switch the activated SIM instance to the first SIM instance in response to detecting the updated value of the particular EF being the specific value. When receiving the SAT/USAT proactive command, the MPU of the subscriber identity card replies to the communication device with a response code '91 XX' which indicates availability of a response data to be fetched (step S1003). Next, the MPU of the Baseband chip in the communication device transmits a FETCH command to obtain the response data (step S1004). When receiving the response data, the MPU of the Baseband chip in the communication device determines that the response data indicates a REFRESH command (step S1005), i.e., the activate SIM instance has been switched to the first SIM instance.

In response to receiving the response data, the MPU of the Baseband chip in the communication device retrieves the updated EFs from the local storage unit (step S1006) and then requests to write one of the updated EFs to the subscriber identity card (step S1007). Subsequently, the MPU of the Baseband chip in the communication device receives a response corresponding to the write request from the subscriber identity card (step S1008). Next, the steps S1006 to S1008 are repeated until all of the updated EFs are written back to the subscriber identity card. Note that, in another embodiment, the MPU of the Baseband chip may directly write the updated EFs back to the subscriber identity card.

Figure 11:
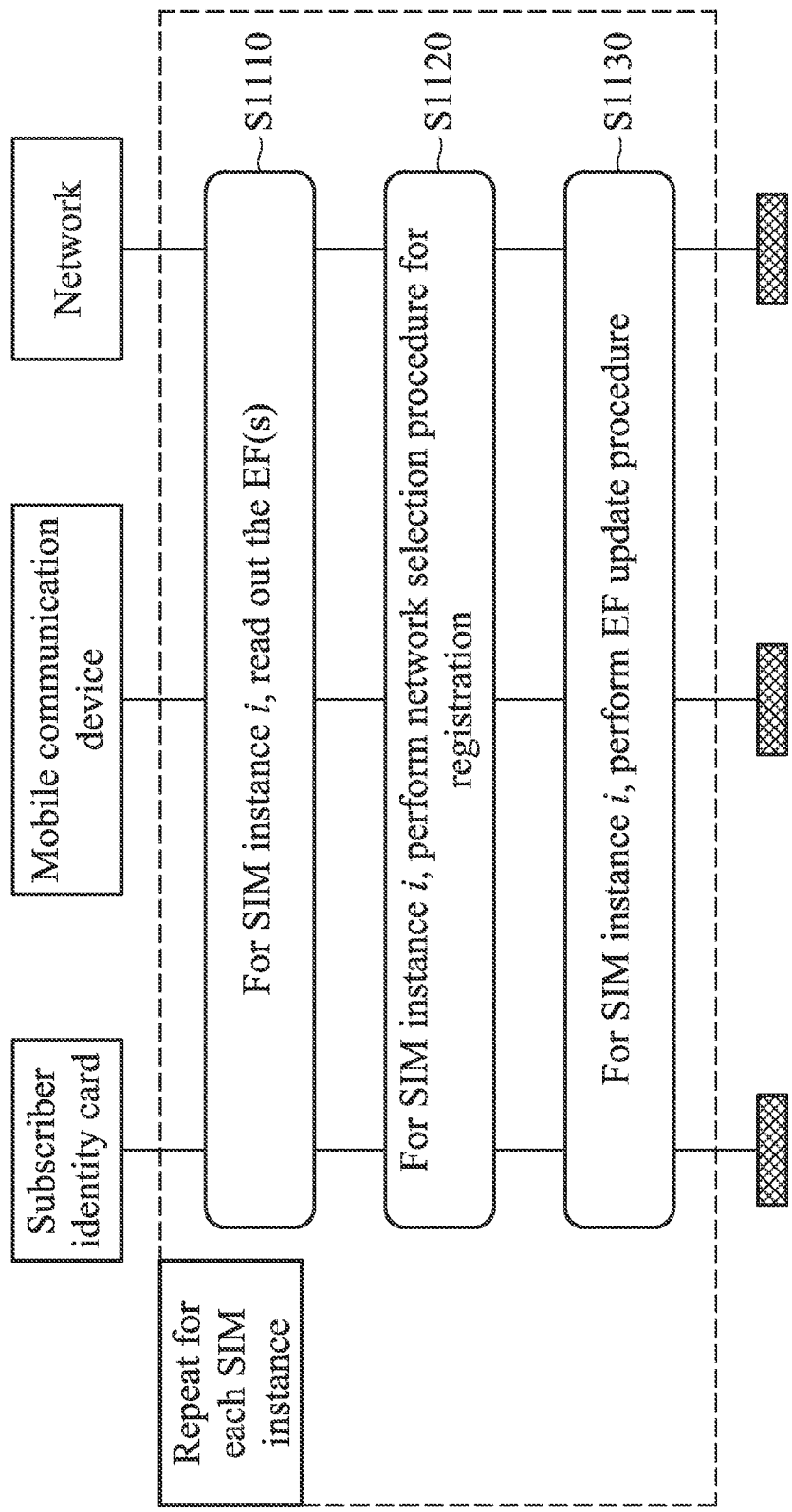
FIG. 11 is a flow chart illustrating the provision of a multi-standby mode of wireless communications in a communication device with a single subscriber identity card comprising a plurality of subscriber numbers according to another embodiment of the invention.

FIG. 11 is a flow chart illustrating the provision of a multi-standby mode of wireless communications in a communication device with a single subscriber identity card comprising a plurality of subscriber numbers according to another embodiment of the invention. At power on, the MPU of a Baseband chip in the communication device performs a refresh procedure to read all EFs of one of the SIM instances in the subscriber identity card (step S1110), wherein each of the SIM instances is corresponding to a respective subscriber number. After the refresh procedure is completed, the MPU of the Baseband chip in the communication device performs a network selection procedure to register itself to a network for the one SIM instance (step S1120). For the case where some EFs may be updated during the registration process of the network selection procedure, the MPU of the Baseband chip in the communication device performs an EF update procedure to write the updated EFs back to the subscriber identity card for the one SIM instance (step S1130). Note that, the step S1130 may be omitted if no EF is updated during the registration process of the network selection procedure. After that, the steps S1110 to S1130 are repeated for the next SIM instance in the subscriber identity card, until all SIM instances are processed. For the detailed descriptions of the refresh procedure, reference may be made to FIG. 7. For the detailed descriptions of the network selection procedure, references may be made to FIGS. 8A, 8B, 9A, and 9B, wherein the steps S804 to S807 and the steps S904 to S907 are omitted since the network selection procedure is performed subsequent to the refresh procedure and no switching of the SIM instances is required. For the detailed descriptions of the EF update procedure, references may be made to FIG. 10, except for that the steps S1002 to S1005 are omitted since the EF update procedure is performed subsequent to the refresh procedure and the network selection procedure and no switching of the SIM instances is required.

Figure 12:
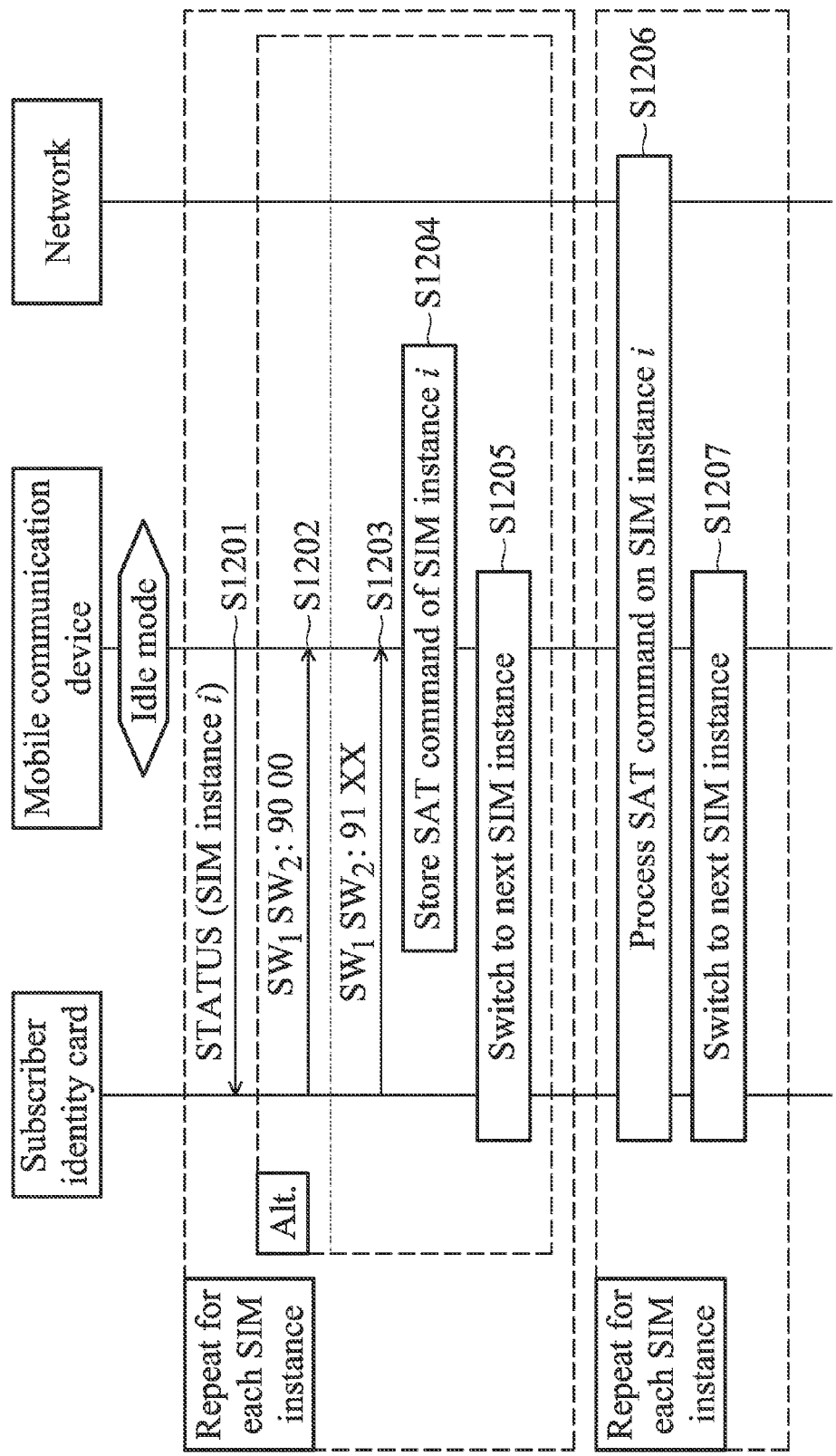
FIG. 12 is a message sequence chart illustrating the polling of a subscriber identity card with multiple subscriber numbers in a communication device configured in a multi-standby mode according to an embodiment of the invention.

FIG. 12 is a message sequence chart illustrating the polling of a subscriber identity card with multiple subscriber numbers in a communication device configured in a multi-standby mode according to an embodiment of the invention. In this embodiment, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. That is, the communication device simultaneously camps on multiple cells provided by the same network or different networks using the subscriber numbers. Note that the multi-standby mode of wireless communications refers to that the communication device is configured in an idle mode of wireless communications with one network for each of the subscriber number. For example, if there are 4 subscriber numbers in the subscriber identity card, which are corresponding to 4 different networks, the communication device may perform the refresh procedures, the network selection procedures, and the EF update procedures as described in FIG. 6 or FIG. 11, to enter the idle mode of wireless communications with the first network using the first subscriber number, to enter the idle mode of wireless communications with the second network using the second subscriber number, and so on. To begin, the MPU of the Baseband chip in the communication device polls the subscriber identity card to see if there's any SAT command of the currently activated SIM instance waiting to be processed, by transmitting a STATUS command indicating the currently activated SIM instance (denoted as SIM instance i in FIG. 12) to the subscriber identity card (step S1201). If there's no SAT command of the currently activated SIM instance waiting to be processed, the MPU of the subscriber identity card replies to the communication device with a response code '90 00' which indicates a normal ending to the initiated command (step S1202). Otherwise, if there's one or more SAT commands of the currently activated SIM instance waiting to be processed, the MPU of the subscriber identity card replies to the communication device with a response code '91 XX' which indicates availability of SAT command(s) to be processed (step S1203). Accordingly, the MPU of the Baseband chip in the communication device stores the information concerning the availability of response data indicating the SAT command(s) to be processed for the currently activated SIM instance (step S1204). Subsequently, the MPU of the Baseband chip in the communication device switches the activated SIM instance to the next SIM instance in the subscriber identity card (step S1205), and repeats the steps S1201 to S1205 until all SIM instances in the subscriber identity card have been polled.

After all SIM instances in the subscriber identity card have been polled, the MPU of the Baseband chip in the communication device fetches the SAT command(s) to be processed for the currently activated SIM instance according to the stored information, and then processes the SAT command(s) (step S1206). Specifically, the MPU of the Baseband chip in the communication device may transmit a FETCH command to obtain the response data indicating a particular SAT/USAT command Next, the MPU of the Baseband chip in the communication device switches the activated SIM instance to the next SIM instance in the subscriber identity card (step S1207), and repeats the steps S1206 to S1207 until the SAT command(s) of all SIM instances in the subscriber identity card are processed.

Figure 13:
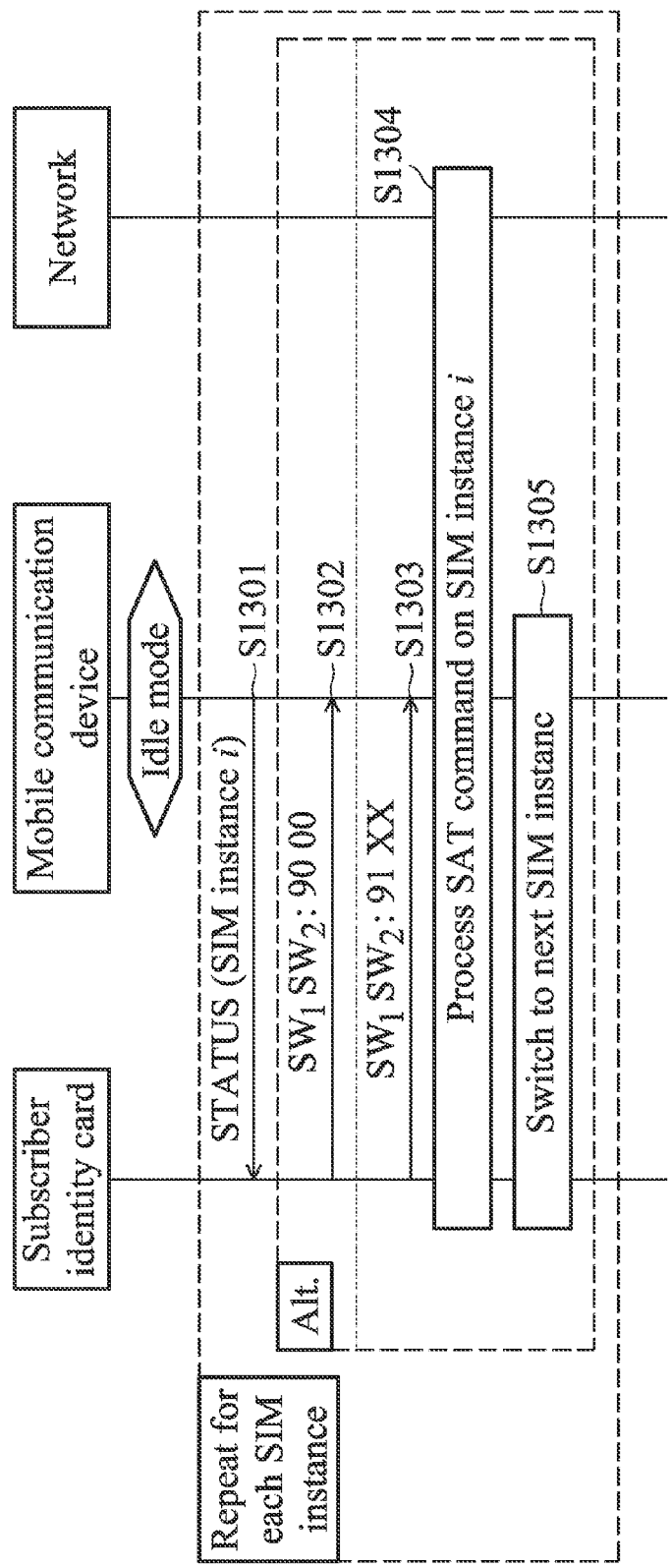
FIG. 13 is a message sequence chart illustrating the polling of a subscriber identity card with multiple subscriber numbers in a communication device configured in a multi-standby mode according to another embodiment of the invention.

FIG. 13 is a message sequence chart illustrating the polling of a subscriber identity card with multiple subscriber numbers in a communication device configured in a multi-standby mode according to another embodiment of the invention. Similar to FIG. 12, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. Different from the embodiment illustrated by FIG. 12, once detecting any SAT command of the currently activated waiting to be processed (step S1303), the MPU of the Baseband chip in the communication device fetches the SAT command(s) to be processed according to the information concerning the availability of the response data indicating the SAT command(s), and then processes the SAT command(s) (step S1304), instead of temporarily storing the SAT command (as shown in step S1204 of FIG. 12) and processing it after all SIM instances are polled (as shown in step S1206 of FIG. 12).

Figure 14:
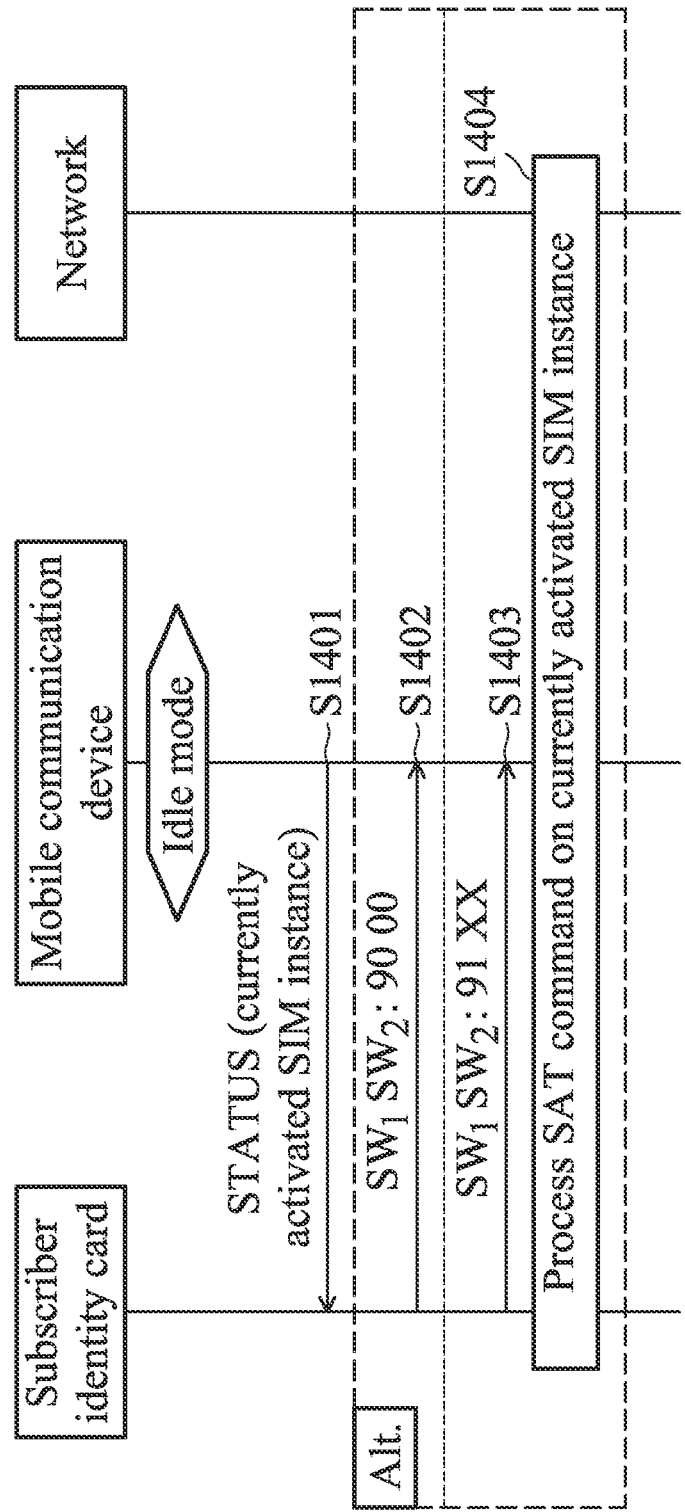
FIG. 14 is a message sequence chart illustrating the polling of a subscriber identity card with multiple subscriber numbers in a communication device configured in a multi-standby mode according to yet another embodiment of the invention.

FIG. 14 is a message sequence chart illustrating the polling of a subscriber identity card with multiple subscriber numbers in a communication device configured in a multi-standby mode according to yet another embodiment of the invention. Similar to FIG. 12, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. Note that, in this embodiment, the SIM instances in the subscriber identity card all share the same series of SAT/USAT commands, so no switching of the SIM instances is required during the polling procedure. Different from embodiments illustrated by FIGS. 12 and 13, such polling does not require to repeat many times for all SIM instances by the MPU of the Baseband chip. When detecting any SAT command waiting to be processed (step S1403), the MPU of the Baseband chip fetches and processes the SAT command (step S1404); otherwise (step S1402), ends the method.

Figure 15:
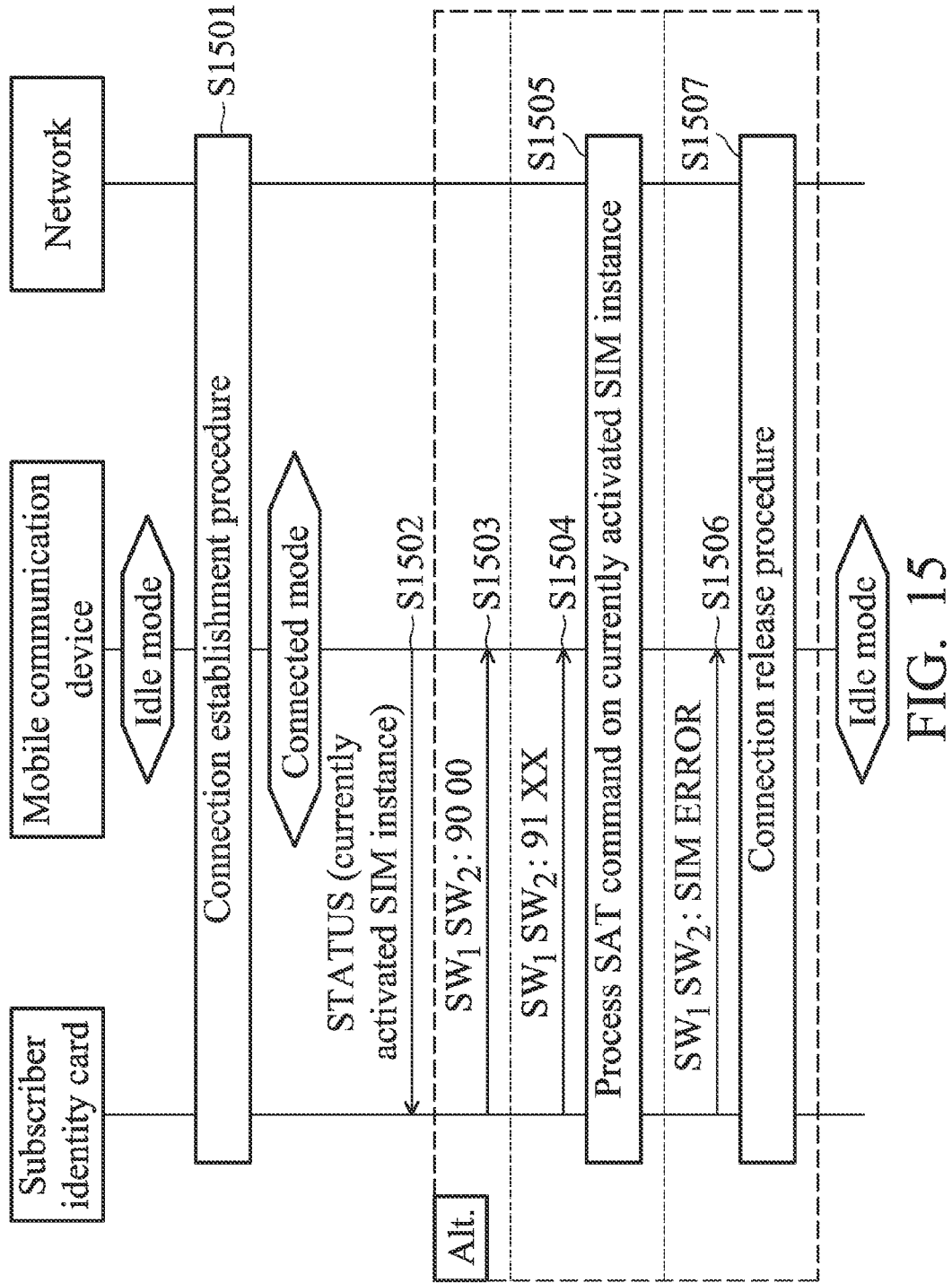
FIG. 15 is a message sequence chart illustrating the polling of a subscriber identity card for only the currently activated SIM instance therein by a communication device configured in a connected mode according to an embodiment of the invention.

FIG. 15 is a message sequence chart illustrating the polling of a subscriber identity card for only the currently activated SIM instance therein by a communication device configured in a connected mode according to an embodiment of the invention. In this embodiment, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. That is, the communication device simultaneously camps on multiple cells provided by the same network or different networks using the subscriber numbers. Note that the multi-standby mode of wireless communications refers to that the communication device is configured in an idle mode of wireless communications with one network for each of the subscriber number. For example, if there are 4 subscriber numbers in the subscriber identity card, which are corresponding to 4 different networks, the communication device may perform the refresh procedures, the network selection procedures, and the EF update procedures as described in FIG. 6 or FIG. 11, to enter the idle mode of wireless communications with the first network using the first subscriber number, and to enter the idle mode of wireless communications with the second network using the second subscriber number, and so on. Note that, in this embodiment, the SIM instances in the subscriber identity card all share the same series of SAT/USAT commands, so no switching of the SIM instances is required during the polling procedure. To begin, the communication device performs a connection establishment procedure to establish a connection with a network using one subscriber number in the subscriber identity card (step S1501). After the connection establishment procedure is completed, the MPU of the Baseband chip in the communication device enters a connected mode of wireless communications with the network, and then polls the subscriber identity card to see if there's any SAT command of the currently activated SIM instance waiting to be processed, by transmitting a STATUS command indicating the currently activated SIM instance to the subscriber identity card (step S1502). If there's no SAT command of the currently activated SIM instance waiting to be processed, the MPU of the subscriber identity card replies to the communication device with a response code '90 00' which indicates a normal ending to the initiated command (step S1503). Otherwise, if there's one or more SAT commands of the currently activated SIM instance waiting to be processed, the MPU of the subscriber identity card replies to the communication device with a response code '91 XX' which indicates availability of SAT command(s) to be processed (step S1504). Accordingly, the MPU of the Baseband chip in the communication device fetches the SAT command(s) to be processed for the currently activated SIM instance according to the information concerning the availability of the response data indicating the SAT command(s), and then processes the SAT command(s) (step S1505). Specifically, the MPU of the Baseband chip in the communication device may transmit a FETCH command to obtain the response data indicating a particular SAT/USAT command. Subsequent to the step S1502, if the subscriber identity card is removed, the MPU of the subscriber identity card replies to the communication device with a response code indicating the occurrence of a SIM error due to the absence of the subscriber identity card (step S1506). Next, the communication device performs a connection release procedure (step S1507), and returns to the idle mode. Note that, in this embodiment, the SIM instances in the subscriber identity card may all share the same series of SAT/USAT commands, no switching among the SIM instances is required during the polling procedure. The detailed descriptions of the connection establishment procedure and connection release procedure are omitted herein since they are beyond the scope of the invention, and references may be made to the release 10 of the 3GPP TS 25.331 specification, v.10.4.0 (referred to herein as the TS 25.331 specification) and the release 10 of the 3GPP TS 44.018 specification, v10.3.0 (referred to herein as the TS 44.018 specification).

Figure 16A:
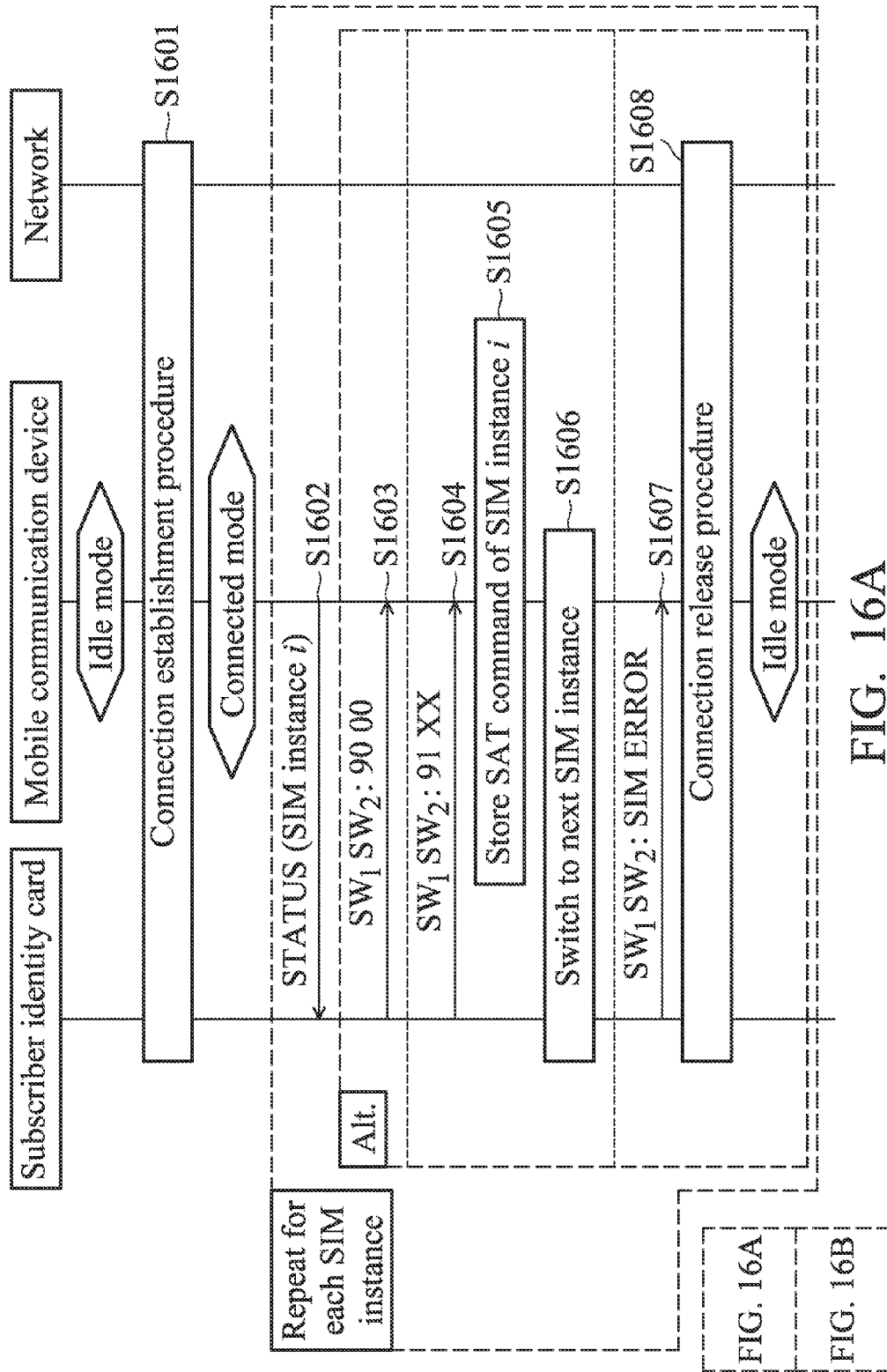
FIGS. 16A and 16B show a message sequence chart of the polling of a subscriber identity card for all SIM instances therein by a communication device configured in a connected mode according to another embodiment of the invention.
Figure 16B:
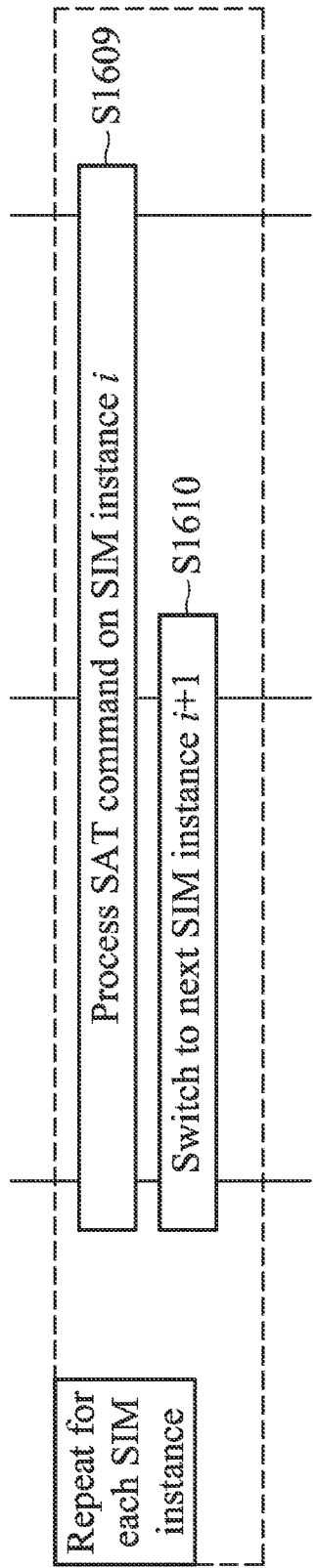

FIGS. 16A and 16B show a message sequence chart of the polling of a subscriber identity card for all SIM instances therein by a communication device configured in a connected mode according to another embodiment of the invention. Note that, in this embodiment, at least two of the SIM instances in the subscriber identity card have their own series of SAT/USAT commands, so switching of the SIM instances is required during the polling procedure (step S1606). Different from the embodiment illustrated by FIG. 15, when detecting that the MPU of the subscriber identity card replies to the communication device with a response code '91 XX' which indicates availability of SAT command(s) to be processed (step S1604). Then, the MPU of the Baseband chip in the communication device temporarily stores the information concerning the availability of response data indicating the SAT command(s) to be processed for the currently activated SIM instance (step S1605).

After all SIM instances in the subscriber identity card have been polled, the MPU of the Baseband chip in the communication device fetches the SAT command(s) to be processed for the currently activated SIM instance (denoted as SIM instance i in FIGS. 16A and 16B) according to the stored information, and then processes the SAT command(s) (step S1609). Specifically, the MPU of the Baseband chip in the communication device may transmit a FETCH command to obtain the response data indicating a particular SAT/USAT command When the processing of the SAT command(s) of the currently activated SIM instance is completed, the MPU of the Baseband chip in the communication device switches the activated SIM instance to the next SIM instance (denoted as SIM instance i+1 in FIGS. 16A and 16B) in the subscriber identity card (step S1610), and repeats the steps S1609 and S1610 until the SAT command(s) of relevant SIM instances in the subscriber identity card are fetched and processed.

Figure 17:
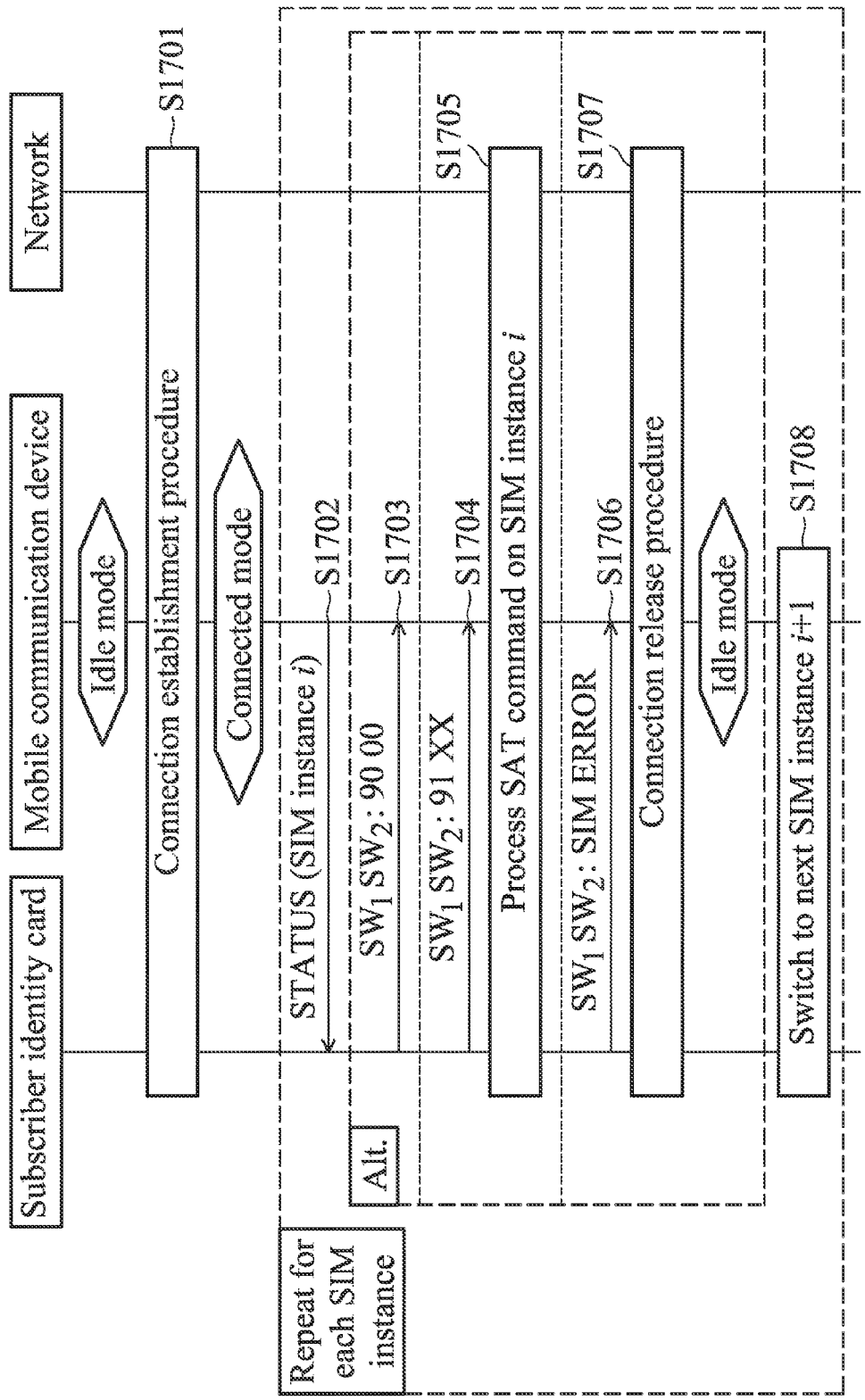
FIG. 17 is a message sequence chart illustrating the polling of a subscriber identity card for all SIM instances therein by a communication device configured in a connected mode according to yet another embodiment of the invention.

FIG. 17 is a message sequence chart illustrating the polling of a subscriber identity card for all SIM instances therein by a communication device configured in a connected mode according to yet another embodiment of the invention. Similar to FIG. 16, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. Different from the embodiment illustrated by FIG. 16, when detecting that the MPU of the subscriber identity card replies to the communication device with a response code '91 XX' which indicates availability of SAT command(s) to be processed (step S1704), the MPU of the Baseband chip in the communication device fetches and processes the SAT command(s) to be processed for the currently activated SIM instance (steps S1705 and S1706), instead of storing the SAT command (as shown in step S1605 of FIG. 16A) and process it after all SIM instances are polled (as shown in step S1609 of FIG. 16B).

Figure 18:
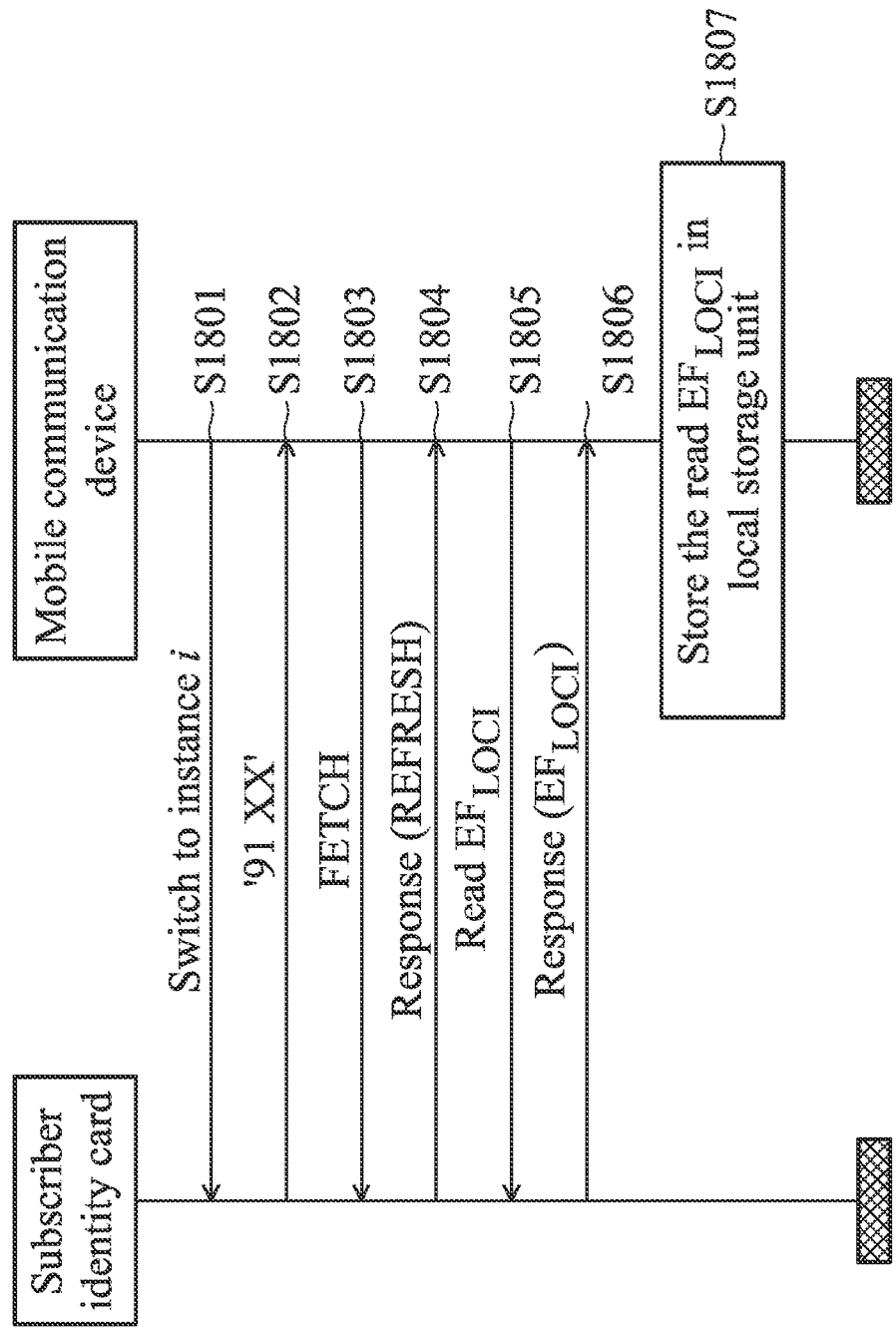
FIG. 18 is a message sequence chart illustrating a SIM instance update procedure for reading a particular EF from a subscriber identity card comprising a plurality of subscriber numbers according to an embodiment of the invention.

Note that, although most of the EFs of all SIM instances may be read from the subscriber identity card and stored in the local storage unit at power on of the communication device as described in FIGS. 6 and 11, some of the remaining EF(s) may be later read from the subscriber identity card when required. FIG. 18 is a message sequence chart illustrating a SIM instance update procedure for reading a particular EF from a subscriber identity card comprising a plurality of subscriber numbers according to an embodiment of the invention. In this embodiment, the SIM instance update procedure is triggered during a network selection procedure in which the $EF_{LOCI}$ is required. As shown in FIG. 18, the SIM instance update procedure starts by the MPU of the Baseband chip in the communication device to transmit a SAT/USAT proactive command to request the subscriber identity card to switch the activated SIM instance to the first SIM instance (step S1801). When receiving the SAT/USAT proactive command, the MPU of the subscriber identity card replies to the communication device with a response code '91 XX' which indicates availability of a response data to be fetched (step S1802). Next, the MPU of the Baseband chip in the communication device transmits a FETCH command to obtain the response data (step S1803). When receiving the response data, the MPU of the Baseband chip in the communication device determines that the response data indicates a REFRESH command (step S1804). After that, the MPU of the Baseband chip in the communication device requests to read the $EF_{LOCI}$ from the subscriber identity card (step S1805) and then receives the $EF_{LOCI}$ from the subscriber identity card (step S1806). The MPU of the Baseband chip in the communication device then stores the read EF in a local storage unit (step S1807). Alternatively, the EFs of one or more SIM instances may be read from the subscriber identity card and stored in the local storage unit at power on of the communication device, and the EFs of other SIM instances may be read later from the subscriber identity card when required, and the invention is not limited thereto.

Figure 19:
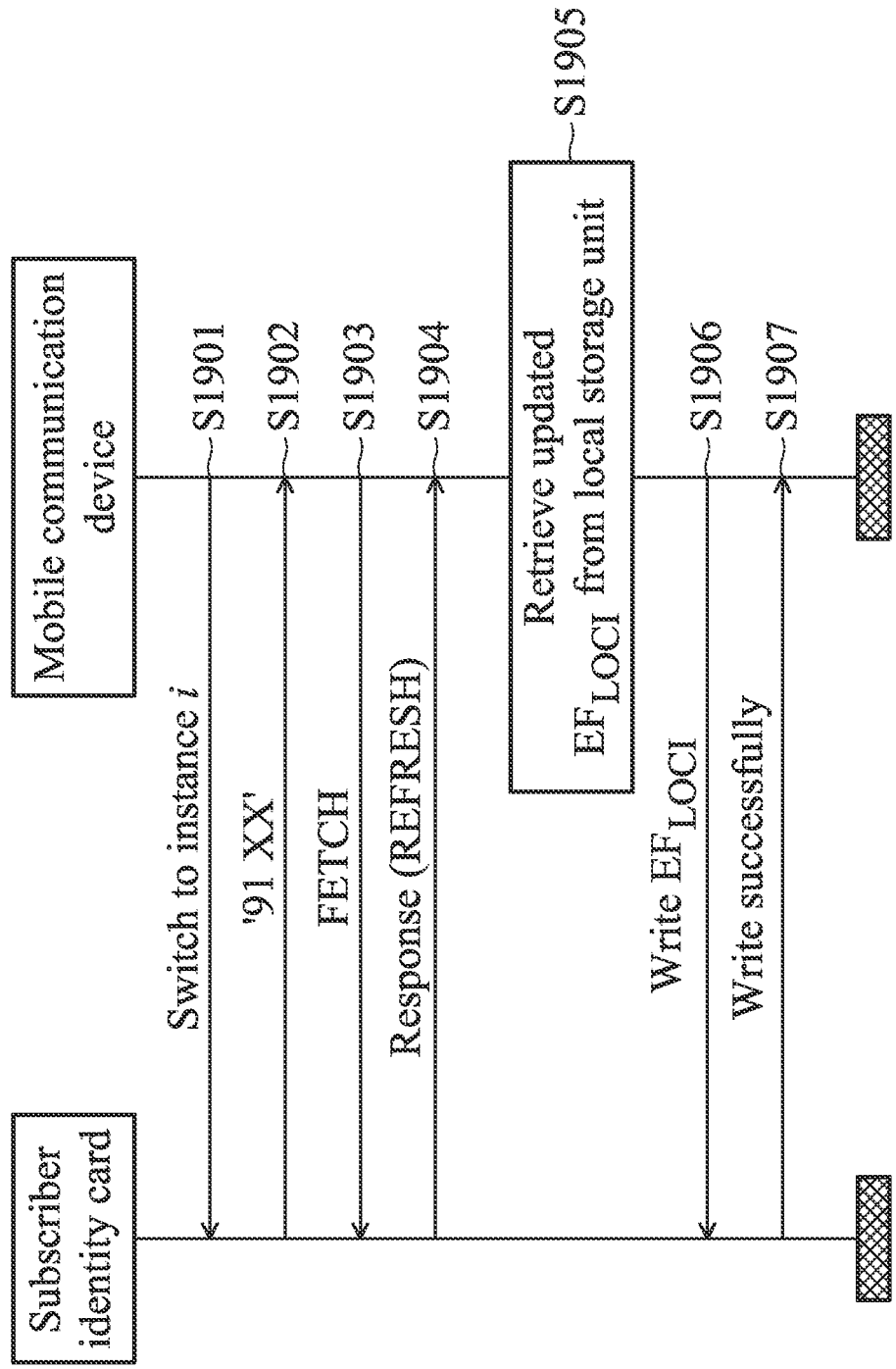
FIG. 19 is a message sequence chart illustrating a SIM instance update procedure for writing a particular EF to a subscriber identity card comprising a plurality of subscriber numbers according to an embodiment of the invention.

FIG. 19 is a message sequence chart illustrating a SIM instance update procedure for writing a particular EF to a subscriber identity card comprising a plurality of subscriber numbers according to an embodiment of the invention. In this embodiment, the SIM instance update procedure is triggered in response to an updated $EF_{LOCI}$ after a location update procedure. As shown in FIG. 19, the SIM instance update procedure starts by the MPU of the Baseband chip in the communication device to transmit a SAT/USAT proactive command to request the subscriber identity card to switch the activated SIM instance to the first SIM instance (step S1901). When receiving the SAT/USAT proactive command, the MPU of the subscriber identity card replies to the communication device with a response code '91 XX' which indicates availability of a response data to be fetched (step S1902). Next, the MPU of the Baseband chip in the communication device transmits a FETCH command to obtain the response data (step S1903). When receiving the response data, the MPU of the Baseband chip in the communication device determines that the response data indicates a REFRESH command (step S1904). Then, the MPU of the Baseband chip in the communication device retrieves the updated $EF_{LOCI}$ from the local storage unit (step S1905) and requests to write the $EF_{LOCI}$ to the subscriber identity card (step S1906). Subsequently, the MPU of the Baseband chip in the communication device receives a write response indicating that the $EF_{LOCI}$ is successfully written to the subscriber identity card (step S1907), and the SIM instance update procedure ends. Note that, in the step S1905, the retrieved EFs from the local storage unit may be more than one, and the steps S1906 and S1907 may be repeated until the retrieved EFs are written to the subscriber identity card. For example, only the updated EFs of some specific SIM instances may be retrieved from the local storage unit and written to the subscriber identity card.

Figure 20:
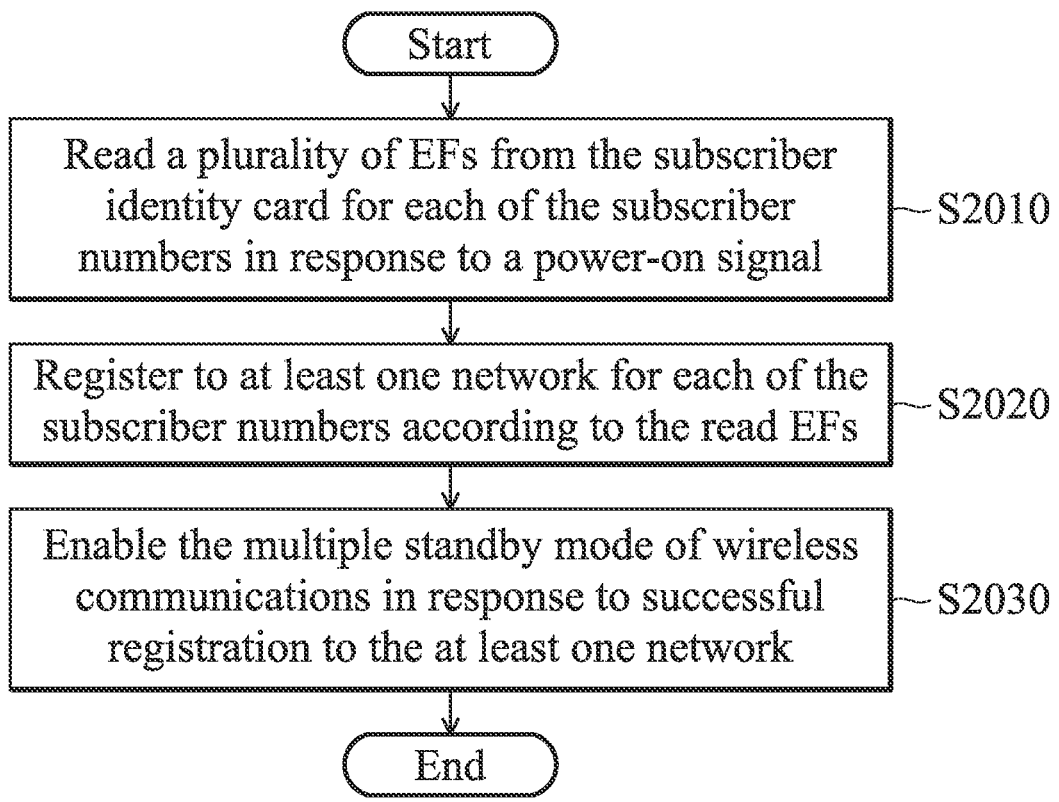
FIG. 20 is a flow chart illustrating a method for providing a multi-standby mode in a communication device with a subscriber identity card comprising a plurality of subscriber numbers according to an embodiment of the invention.

FIG. 20 is a flow chart illustrating a method for providing a multi-standby mode in a communication device with a subscriber identity card comprising a plurality of subscriber numbers according to an embodiment of the invention. The method may be applied in any communication device which is coupled with a subscriber identity card comprising a plurality of subscriber numbers, and may be executed by an MPU of a Baseband chip in the communication device. To begin the method, the MPU of the Baseband chip in the communication device reads a plurality of EFs from the subscriber identity card for each of the subscriber numbers in response to a power-on signal (step S2010). The power-on signal may be generated for the communication device being powered on, i.e., the method is performed for the communication device being powered on. Specifically, the reading of the EFs from the subscriber identity card may further comprise issuing a first command to the subscriber identity card for activating one SIM instance, and receiving a response code corresponding to the first command from the subscriber identity card, wherein the response code indicates the communication device to later fetch a proactive command. Subsequently, the MPU of the Baseband chip in the communication device issues a second command to the subscriber identity card to fetch the proactive command, and then starts reading the EFs from the subscriber identity card after the proactive command is fetched. In one embodiment, the read EFs may be stored in a local storage unit of the communication device, such as a FLASH memory or a NVRAM, or a magnetic storage device, such as a hard disk or a magnetic tape, or an optical disc. After the EFs are read from the subscriber identity card for all subscriber numbers, the MPU of the Baseband chip in the communication device registers to at least one network for each of the subscriber numbers according to the read EFs (step S2020). Specifically, the registration to the at least one network may further comprise a cell selection procedure to camp on a cell of the network before transmitting a registration request to the network. For the step S2020, the MPU of the Baseband chip in the communication device may perform the registration to at least one network at a time for one of the subscriber numbers, until registrations to the networks for all of the subscriber numbers have been attempted. In one embodiment, all of the subscriber numbers may be issued by the same network operator, and the communication device may register to the same network or multiple networks deployed by the same network operator using the subscriber numbers. In another embodiment, the subscriber numbers may be issued by different network operators, and the communication device may register to a plurality of networks respectively deployed by different network operators using the subscriber numbers. Next, the MPU of the Baseband chip in the communication device enables a multi-standby mode of wireless communications in response to successful registration to at least one network (step S2030). Note that, during the registration to the at least one network, one or more of the EFs may be updated, so the MPU of the Baseband chip in the communication device may write the updated EF(s) back to the subscriber identity card immediately, or may write the updated EF(s) in the local storage unit and then write back to the subscriber identity card later.

Figure 21:
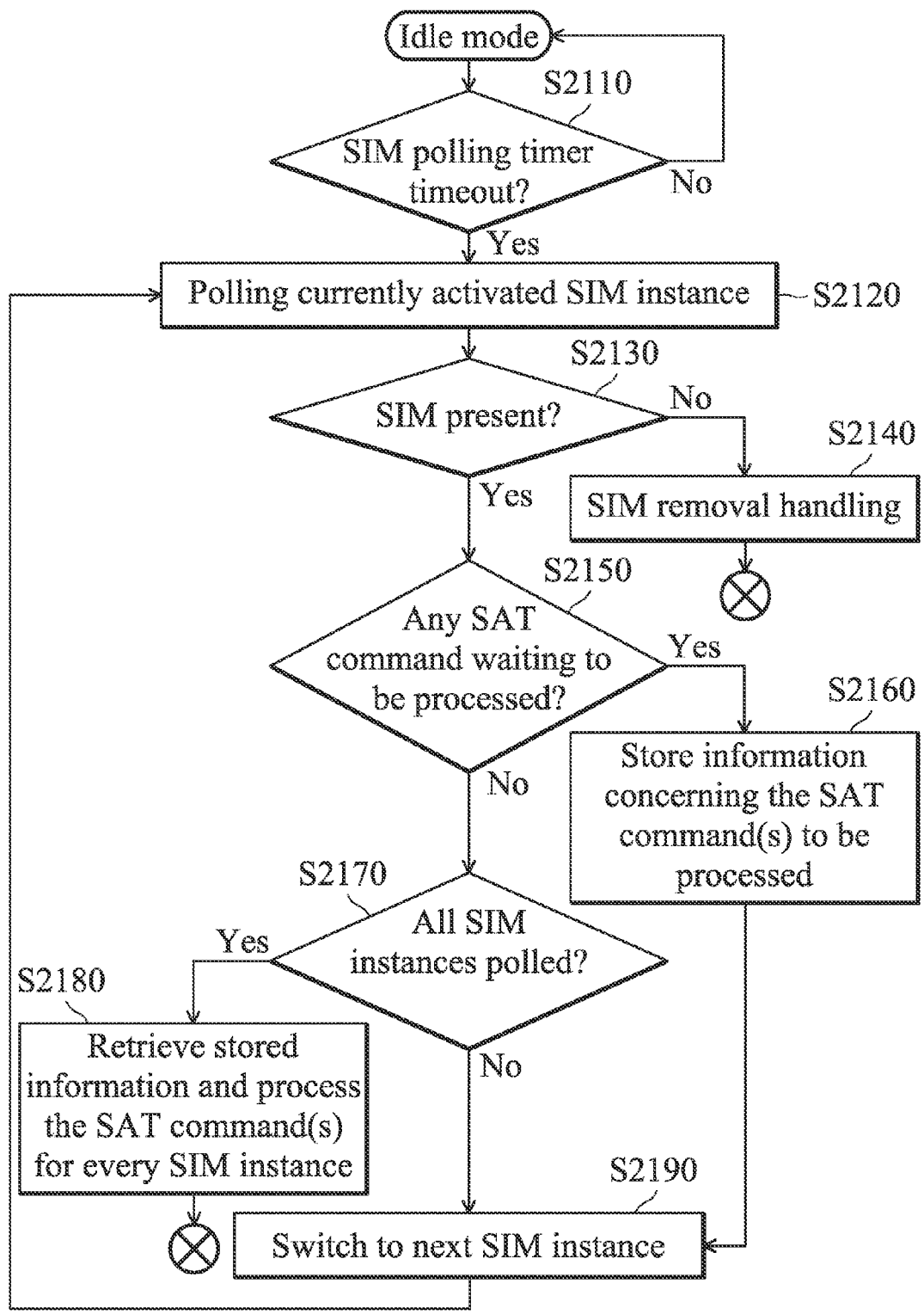
FIG. 21 is a flow chart illustrating a method for polling a subscriber identity card with multiple subscriber numbers in a communication device configured in a multi-standby mode according to an embodiment of the invention.

FIG. 21 is a flow chart illustrating a method for polling a subscriber identity card storing multiple subscriber numbers in a communication device configured to a multi-standby mode according to an embodiment of the invention. The method may be applied in any communication device which is coupled with a subscriber identity card comprising a plurality of subscriber numbers, and may be executed by an MPU of a Baseband chip in the communication device. In this embodiment, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. That is, the communication device simultaneously camps on multiple cells provided by the same network or different networks using the subscriber numbers. Note that the multi-standby mode of wireless communications refers to that the communication device is configured in an idle mode of wireless communications with one network for each of the subscriber number. To begin the method, the MPU of the Baseband chip in the communication device first determines whether a timer for polling the subscriber identity card has expired (step S2110). If not, the MPU of the Baseband chip in the communication device remains in the idle mode, and if so, the MPU of the Baseband chip in the communication device polls the subscriber identity card to see if there's any SAT command of the currently activated SIM instance waiting to be processed (step S2120). The MPU of the Baseband chip in the communication device then determines whether the subscriber identity card is present (step S2130). If receiving no polling response in a predetermined time period, which indicates absence of the subscriber identity card, the MPU of the Baseband chip in the communication device continues to perform a SIM removal handling procedure (step S2140), and the method ends. Detailed descriptions of the SIM removal handling procedure are omitted herein since they are beyond the scope of the invention, and references may be made to the TS 23.122, 43.022, 25.304, and 36.304 specifications. Otherwise, if receiving any polling response, which indicates that the subscriber identity card is present, the MPU of the Baseband chip in the communication device further determines whether the polling response indicates that there's at least one SAT command for the currently activated SIM instance waiting to be processed (step S2150). If so, the MPU of the Baseband chip in the communication device stores the information concerning the SAT command(s) to be processed for the currently activated SIM instance (step S2160), and if not, the MPU of the Baseband chip in the communication device determines whether all SIM instances in the subscriber identity card have been polled (step S2170). If all SIM instances have been polled, the MPU of the Baseband chip in the communication device retrieves the stored information concerning the SAT command(s) to be processed and processes the SAT command(s) of each of the SIM instances (step S2180), and the method ends. Specifically, the MPU of the Baseband chip in the communication device may first fetch the SAT command(s) to be processed from the subscriber identity card according to the stored information, and then process the fetched SAT command(s). Otherwise, if there's at least another SIM instance not polled, the MPU of the Baseband chip in the communication device switches the currently activated SIM instance to the next un-polled SIM instance (step S2190), and repeats the steps S2120 to S2190.

Figure 22:
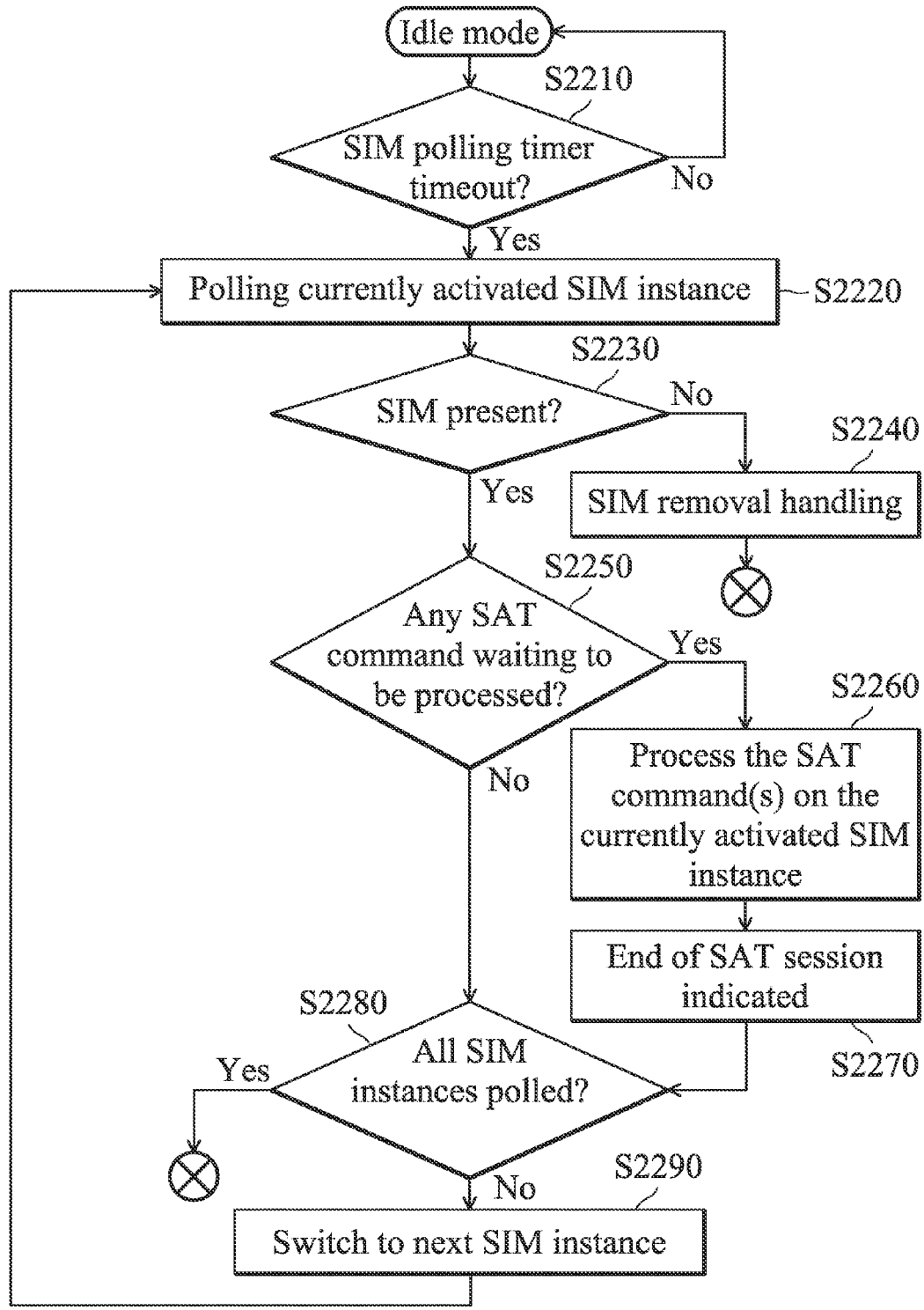
FIG. 22 is a flow chart illustrating a method for polling a subscriber identity card with multiple subscriber numbers in a communication device configured in a multi-standby mode according to another embodiment of the invention.

FIG. 22 is a flow chart illustrating a method for polling a subscriber identity card storing multiple subscriber numbers in a communication device configured to a multi-standby mode according to another embodiment of the invention. The method may be applied in any communication device which is coupled with a subscriber identity card comprising a plurality of subscriber numbers, and may be executed by an MPU of a Baseband chip in the communication device. Different from the embodiment illustrated by FIG. 21, each time detecting a SAT command waiting to be processed (the Yes branch from step S2250), the MPU of the Baseband chip in the communication device processes the SAT command(s) of the currently activated SIM instance (step S2260), and stops processing when detecting the end of the SAT session (step S2270), instead of processing waited SAT commands in turn after completing polling all SIM instances (as shown in step S2180 of FIG. 21).

Figure 23:
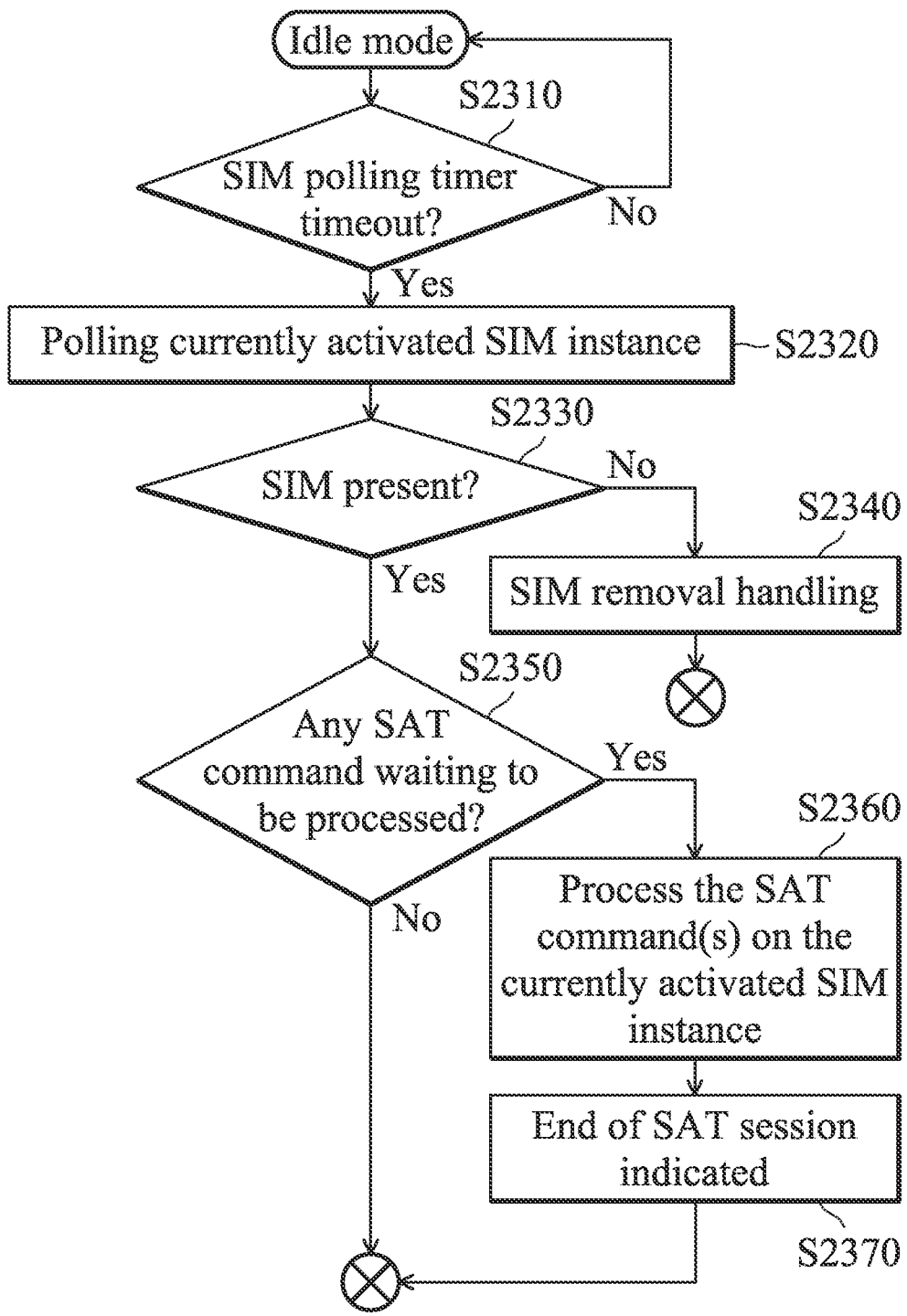
FIG. 23 is a flow chart illustrating a method for polling a subscriber identity card with multiple subscriber numbers in a communication device configured in a multi-standby mode according to another embodiment of the invention.

FIG. 23 is a flow chart illustrating a method for polling a subscriber identity card with multiple subscriber numbers in a communication device configured in a multi-standby mode according to another embodiment of the invention. The method may be applied in any communication device which is coupled with a subscriber identity card comprising a plurality of subscriber numbers, and may be executed by an MPU of a Baseband chip in the communication device. Note that, in this embodiment, the SIM instances in the subscriber identity card may all share the same series of SAT/USAT commands. Different from the embodiment illustrated by FIG. 21, when detecting a SAT command waiting to be processed (the Yes branch from step S2350), the MPU of the Baseband chip in the communication device processes the SAT command(s) of the currently activated SIM instance (step S2360), and stops processing when detecting the end of the SAT session (step S2370).

Figure 24:
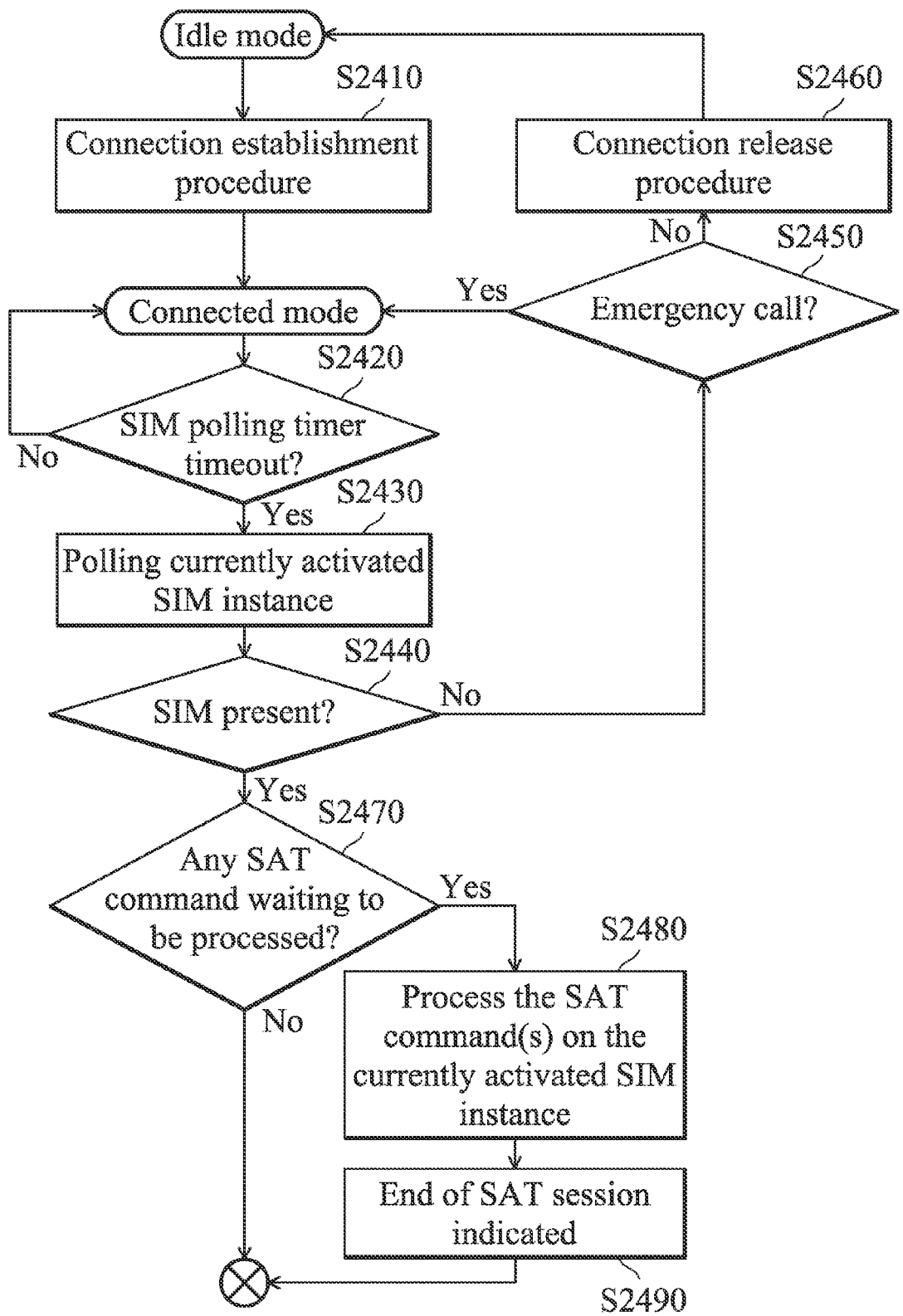
FIG. 24 is a flow chart illustrating a method for polling a subscriber identity card with multiple subscriber numbers in a communication device configured in a connected mode according to an embodiment of the invention.

FIG. 24 is a flow chart illustrating a method for polling a subscriber identity card with multiple subscriber numbers in a communication device configured in a connected mode according to an embodiment of the invention. The method may be applied in any communication device which is coupled with a subscriber identity card comprising a plurality of subscriber numbers, and may be executed by an MPU of a Baseband chip in the communication device. In this embodiment, the communication device has completed the refresh procedures, the network selection procedures, and the EF update procedures as described in FIG. 6 or FIG. 11, and entered the multi-standby mode of wireless communications with the subscriber identity card comprising a plurality of subscriber numbers. That is, the communication device simultaneously camps on multiple cells provided by the same network or different networks using the subscriber numbers. To begin the method, the MPU of the Baseband chip in the communication device performs a connection establishment procedure to establish a connection with a network using one subscriber number in the subscriber identity card (step S2410). After the connection establishment procedure is completed, the MPU of the Baseband chip in the communication device enters a connected mode of wireless communications with the network, and then determines whether a timer for polling the subscriber identity card has expired (step S2420). If not, the MPU of the Baseband chip in the communication device remains in the connected mode, and if so, the MPU of the Baseband chip in the communication device polls the subscriber identity card to see if there's any SAT command of the currently activated SIM instance waiting to be processed (step S2430). Then, the MPU of the Baseband chip in the communication device determines whether the subscriber identity card is present (step S2440). If detecting no polling response in a predetermined time period (may mean absence of the subscriber identity card), the MPU of the Baseband chip in the communication device further determines whether the connection is established for an emergency call (step S2450). The MPU of the Baseband chip in the communication device remains in the connected mode if the connection is established for an emergency call. If the connection is not established for an emergency call, the MPU of the Baseband chip in the communication device continues to perform a connection release procedure (step S2460), and then returns to the idle mode when the radio resources associated with the connection are released. Detailed descriptions of the connection establishment procedure and the connection release procedure are omitted herein since they are beyond the scope of the invention, and references may be made to the TS 44.018 and 25.331 specifications. Subsequent to the step S2440, if receiving any polling response in the predetermined time period (means that the subscriber identity card is present), the MPU of the Baseband chip in the communication device further determines whether the polling response indicates that there's at least one SAT command for the currently activated SIM instance waiting to be processed (step S2470). If so, the MPU of the Baseband chip in the communication device processes the SAT command(s) of the currently activated SIM instance (step S2480), and stops processing when detecting the end of the SAT session (step S2490). Specifically, the MPU of the Baseband chip in the communication device may first fetch the SAT command(s) to be processed from the subscriber identity card according to the information indicated in the polling response, and then process the fetched SAT command(s). Subsequent to the step S2470, if not, the method ends. Note that, in another embodiment, the SIM instances in the subscriber identity card may all share the same series of SAT/USAT commands, and no switching among the SIM instances is required during the polling procedure.

Figure 25A:
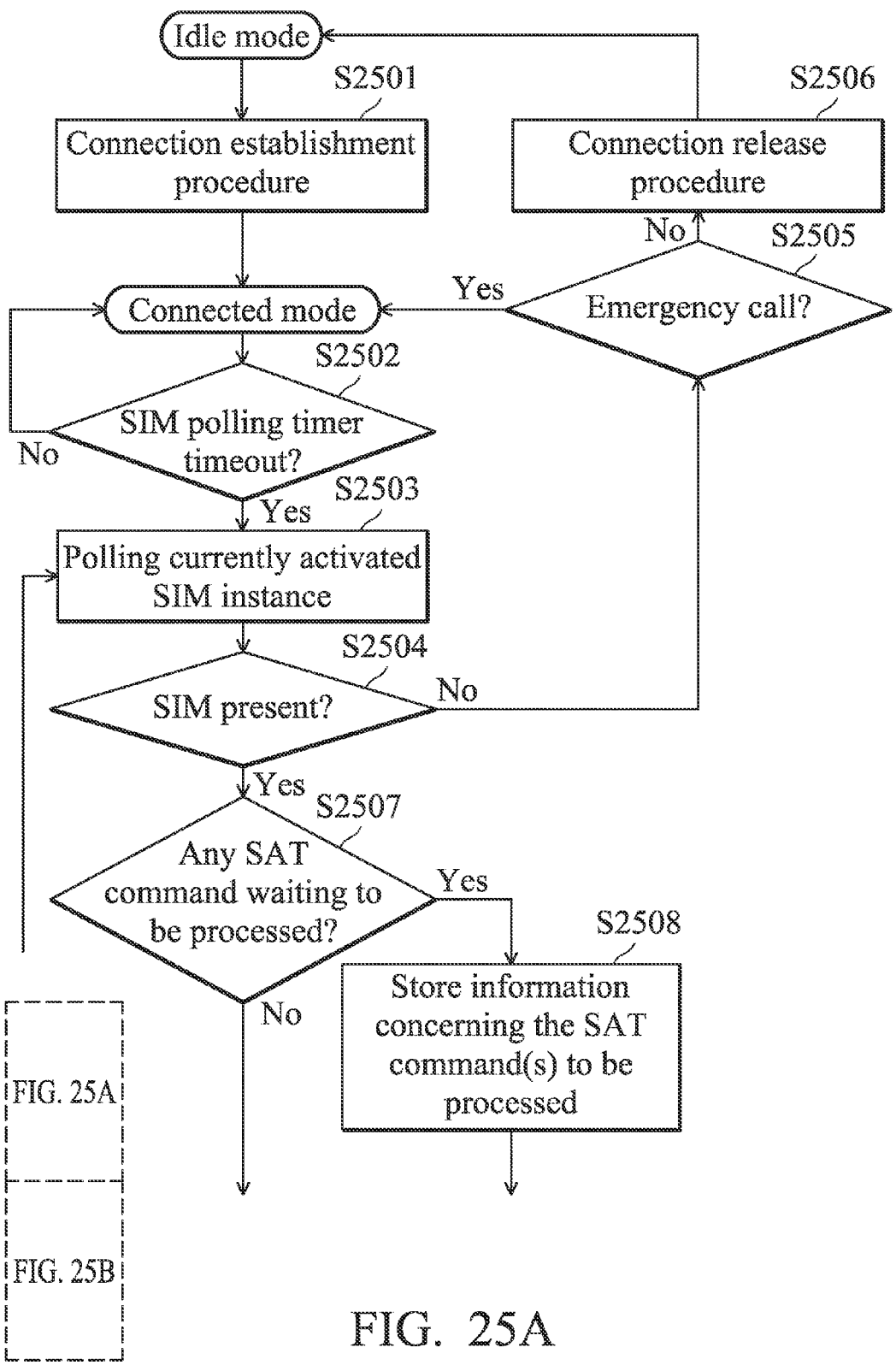
FIGS. 25A and 25B show a flow chart of a method for polling a subscriber identity card with multiple subscriber numbers in a communication device configured in a connected mode according to another embodiment of the invention.
Figure 25B:
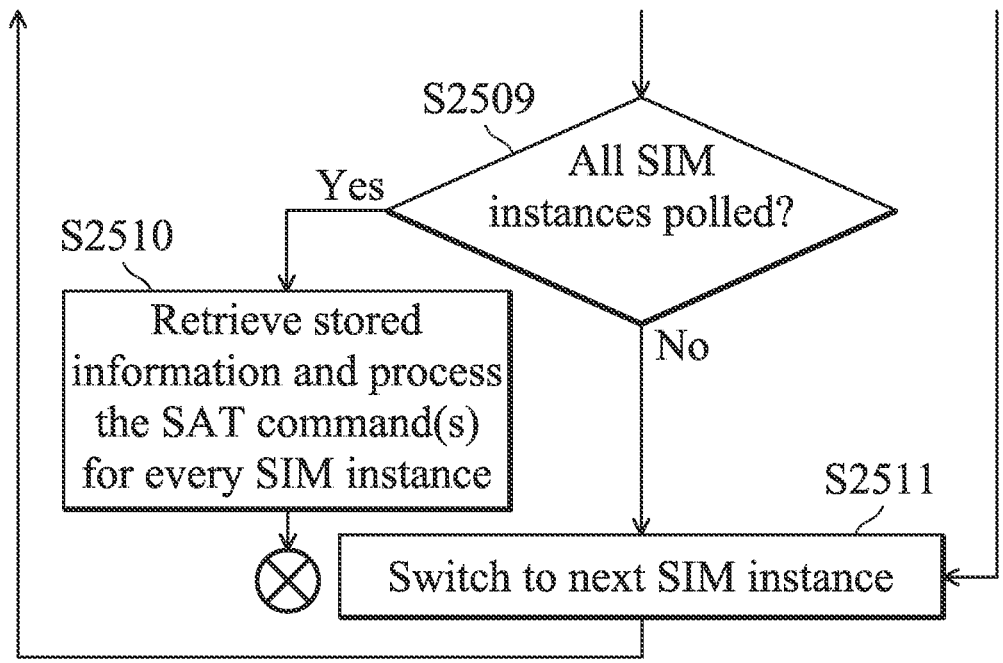

FIGS. 25A and 25B show a flow chart of a method for polling a subscriber identity card with multiple subscriber numbers in a communication device configured in a connected mode according to another embodiment of the invention. The method may be applied in any communication device which is coupled with a subscriber identity card comprising a plurality of subscriber numbers, and may be executed by an MPU of a Baseband chip in the communication device. Different from FIG. 24, the communication device polls all SIM instances in turn when entering the connected mode, as shown in a loop formed by steps S2503, S2504, S2507, S2509 and S2511. Additionally, each time detecting any SAT command waiting to be processed (Yes branch from step S2507), the MPU of the Baseband chip in the communication device stores the information concerning the SAT command(s) to be processed for the currently activated SIM instance (step S2508), and after all SIM instances have been polled, retrieves and processes the stored SAT command(s) (step S2510).

Figure 26:
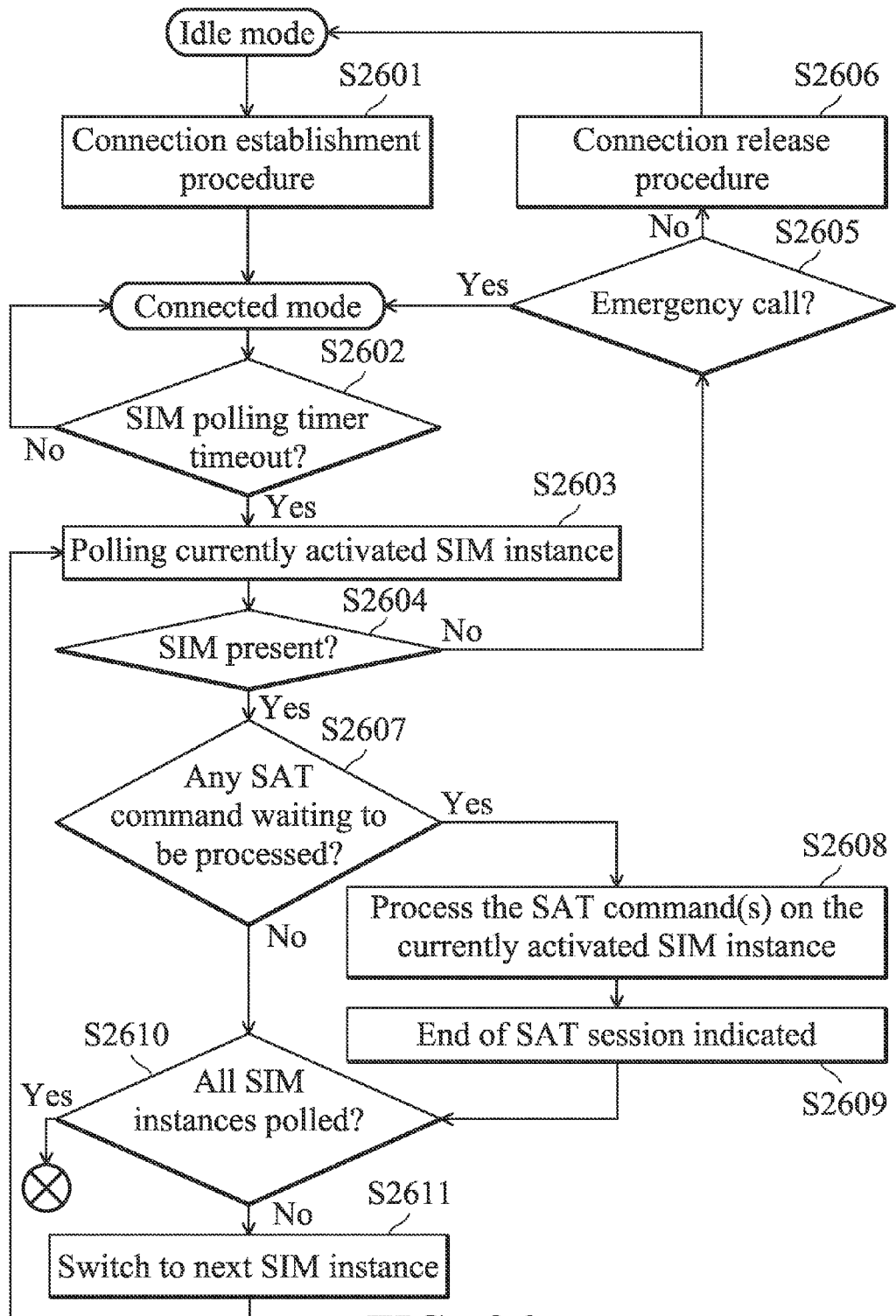
FIG. 26 is a flow chart illustrating a method for polling a subscriber identity card with multiple subscriber numbers in a communication device configured in a connected mode according to yet another embodiment of the invention.

FIG. 26 is a flow chart illustrating a method for polling a subscriber identity card with multiple subscriber numbers in a communication device configured in a connected mode according to yet another embodiment of the invention. The method may be applied in any communication device which is coupled with a subscriber identity card comprising a plurality of subscriber numbers, and may be executed by an MPU of a Baseband chip in the communication device. Different from FIG. 25, each time detecting a SAT command waiting to be processed, the MPU of the Baseband chip in the communication device processes the SAT command(s) of the currently activated SIM instance (step S2608), and stops processing when detecting the end of the SAT session (step S2609), instead of temporarily storing them as shown in step S2508 for later execution.

Figure 27:
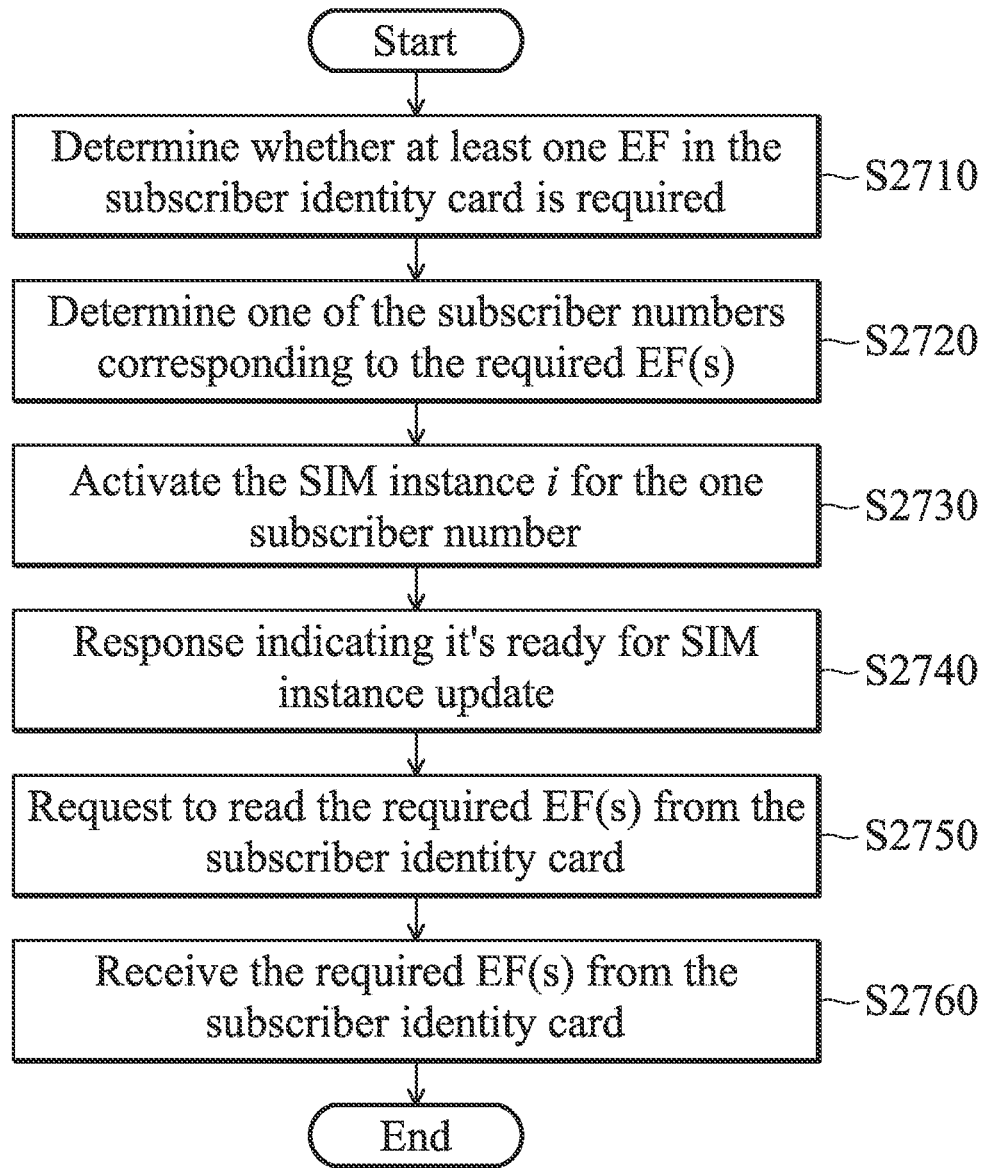
FIG. 27 is a flow chart illustrating a SIM instance update method for reading a particular EF from a subscriber identity card comprising a plurality of subscriber numbers according to an embodiment of the invention.

FIG. 27 is a flow chart illustrating a SIM instance update method for reading a particular EF from a subscriber identity card comprising a plurality of subscriber numbers according to an embodiment of the invention. The SIM instance update method may be applied in any communication device which is coupled with a subscriber identity card comprising a plurality of subscriber numbers, and may be executed by an MPU of a Baseband chip in the communication device. To begin the SIM instance update method, the MPU of the Baseband chip in the communication device determines whether at least one EF in the subscriber identity card is required (step S2710). Specifically, the step S2710 may be performed during a network selection procedure in which one or more EFs are required for the registration process of the network selection procedure, such as the $EF_{LOCI}$, $EF_{ACC}$, etc. Due to the fact that at least one EF in the subscriber identity card is required, the MPU of the Baseband chip in the communication device determines one of the subscriber numbers corresponding to the required EF(s) (step S2720), and then activates the SIM instance (denoted as SIM instance i in FIG. 27) in the subscriber identity card for the one subscriber number (step S2730). Specifically, each SIM instance in the subscriber identity card is corresponding to a respective subscriber number and each of the SIM instances contains a plurality of EFs associated with the corresponding subscriber number. Subsequently, the MPU of the subscriber identity card replies to the communication device with a response indicating it's ready for the SIM instance update (step S2740). To further clarify the steps S2730 and S2740, the MPU of the Baseband chip in the communication device may first transmit a SAT/USAT proactive command to request the subscriber identity card to switch the activated SIM instance to the one SIM instance which contains the required EF(s), and then receive from the subscriber identity card a response code '91 XX' which indicates availability of a response data to be fetched. In response to the response code, the MPU of the Baseband chip in the communication device may further transmit a FETCH command to obtain the response data indicating a REFRESH command for reading the required EF(s). In another embodiment, the steps S2730 and S2740 may be omitted, if the currently activated SIM instance contains the required EF(s). After being notified that the subscriber identity card is ready for the SIM instance update, the MPU of the Baseband chip in the communication device requests to read the required EF(s) from the subscriber identity card (step S2750) and then receives the required EF(s) from the subscriber identity card (step S2760). Note that, if there is more than one EF to be read from the subscriber identity card, the steps S2750 and S2760 may be repeated until all required EFs are read.

Figure 28:
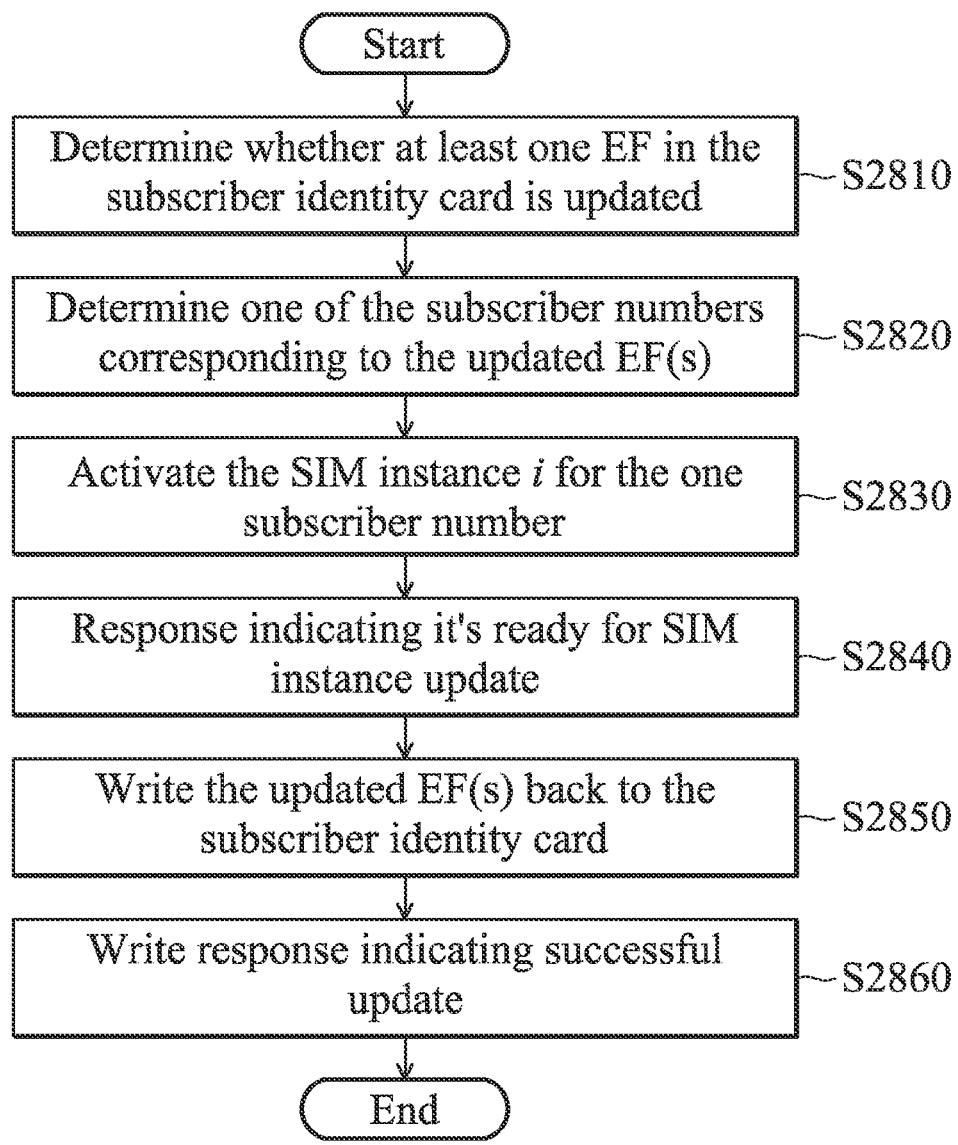
FIG. 28 is a flow chart illustrating a SIM instance update method for writing a particular EF to a subscriber identity card comprising a plurality of subscriber numbers according to an embodiment of the invention.

FIG. 28 is a flow chart illustrating a SIM instance update method for writing a particular EF to a subscriber identity card comprising a plurality of subscriber numbers according to an embodiment of the invention. The SIM instance update method may be applied in any communication device which is coupled with a subscriber identity card comprising a plurality of subscriber numbers, and may be executed by an MPU of a Baseband chip in the communication device. To begin the SIM instance update method, the MPU of the Baseband chip in the communication device determines whether at least one EF read from the subscriber identity card is updated (step S2810). Specifically, the step S2810 may be performed during a registration process in which one or more EFs are updated, such as the $EF_{LOCI}$. Due to the fact that at least one read EF is updated, the MPU of the Baseband chip in the communication device determines one of the subscriber numbers corresponding to the updated EF(s) (step S2820), and then activates the SIM instance (denoted as SIM instance i in FIG. 28) in the subscriber identity card for the one subscriber number (step S2830). Specifically, each SIM instance in the subscriber identity card is corresponding to a respective subscriber number and each of the SIM instances contains a plurality of EFs associated with the corresponding subscriber number. Subsequently, the MPU of the subscriber identity card replies to the communication device with a response indicating it's ready for the SIM instance update (step S2840). To further clarify the steps S2830 and S2840, the MPU of the Baseband chip in the communication device may first transmit a SAT/USAT proactive command to request the subscriber identity card to switch the activated SIM instance to the one SIM instance which contains the required EF(s), and then receive from the subscriber identity card a response code '91 XX' which indicates availability of a response data to be fetched. In response to the response code, the MPU of the Baseband chip in the communication device may further transmit a FETCH command to obtain the response data indicating a REFRESH command for writing the updated EF(s). In another embodiment, the steps S2830 and S2840 may be omitted, if the currently activated SIM instance contains the EF(s) to be updated. After being notified that the subscriber identity card is ready for the SIM instance update, the MPU of the Baseband chip in the communication device requests to write the updated EF(s) back to the subscriber identity card (step S2850) and then receives a write response indicating that the updated EF(s) have been successfully written to the subscriber identity card (step S2860). Note that, if there is more than one updated EF to be written to the subscriber identity card, the steps S2850 and S2860 may be repeated until all updated EFs are written back to the subscriber identity card.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication device, comprising:
a processing unit, configured to enable a multi-standby mode of wireless communications with a single subscriber identity card comprising a plurality of subscriber numbers, configured to poll a plurality of SIM instances in the subscriber identity card respectively corresponding to the subscriber numbers, configured to determine whether there is any command waiting to be processed for each of the polled SIM instances, and if so, configured to process at least one determined command from the polled SIM instances.

2. The communication device of claim 1, wherein the processing unit polls one of the SIM instances at a time for each of the subscriber numbers.

3. The communication device of claim 1, wherein the processing unit further:
issues a first command to the subscriber identity card for activating the SIM instance;
receives a response code corresponding to the first command from the subscriber identity card; and
determines whether the response code indicates the communication device to fetch a command.

4. The communication device of claim 3, wherein, prior to processing the determined command, the processing unit further stores information concerning fetching the proactive command, and the processing of the determined command is performed when all SIM instances in the subscriber identity card are polled and every command corresponding to the SIM instances to be processed is determined.

5. The communication device of claim 1, wherein the processing unit issues a second command to the subscriber identity card to fetch the determined command.

6. A method for polling a single subscriber identity card comprising a plurality of subscriber numbers, executed by a micro-processing unit (MPU) of a Baseband chip, comprising:
enabling a multi-standby mode of wireless communications with a single subscriber identity card comprising a plurality of subscriber numbers;
polling a plurality of SIM instances in the subscriber identity card respectively corresponding to the subscriber numbers;
determining whether there is any command waiting to be processed corresponding to each of the polled SIM instances; and
if so, processing at least one determined command from the polled SIM instances.

7. The method of claim 6, wherein the step of polling the SIM instances further comprises polling one of the SIM instances at a time for each of the subscriber numbers.

8. The method of claim 6, wherein the step of determining of whether there is any command waiting to be processed further comprises:
issuing a first command to the subscriber identity card for activating the SIM instance;
receiving a response code corresponding to the first command from the subscriber identity card; and
determining whether the response code indicates the communication device to fetch a command.

9. The method of claim 8, further comprising:
storing information concerning fetching the proactive command, prior to processing the determined command,
wherein the step of processing the determined command is performed when all SIM instances in the subscriber identity card are polled and every command corresponding to the SIM instances to be processed is determined.

10. The method of claim 6, wherein the step of processing the determined command further comprises issuing a second command to the subscriber identity card to fetch the determined command.

11. A communication device, comprising:
a processing unit, configured to enable a connected mode of wireless communications with one of a plurality of subscriber numbers in a single subscriber identity card, configured to poll a plurality of SIM instances in the subscriber identity card respectively corresponding to the subscriber numbers, configured to determine whether the subscriber identity card remains detected and whether there is any command waiting to be processed for each of the polled SIM instances, and if so, configured to process at least one determined command from the polled SIM instances.

12. The communication device of claim 11, wherein the processing unit polls one of the SIM instances at a time for each of the subscriber numbers.

13. The communication device of claim 11, wherein the processing unit further:
issues a first command to the subscriber identity card for activating the SIM instance;
receives a response code corresponding to the first command from the subscriber identity card; and
determines whether the response code indicates the communication device to fetch a command.

14. The communication device of claim 13, wherein, prior to processing the determined command, the processing unit further stores information concerning fetching the proactive command, and the processing of the determined command is performed when all SIM instances in the subscriber identity card are polled and every command corresponding to the SIM instances to be processed is determined.

15. The communication device of claim 11, wherein the processing unit issues a second command to the subscriber identity card to fetch the determined command.

16. The communication device of claim 11, wherein the processing unit further performs a connection release procedure in response to the subscriber identity card being undetected.

17. A method for polling a single subscriber identity card, executed by a micro-processing unit (MPU) of a Baseband chip, comprising:
enabling a connected mode of wireless communications with one of a plurality of subscriber numbers in a single subscriber identity card;
polling a plurality of SIM instances in the subscriber identity card respectively corresponding to the subscriber numbers;
determining whether the subscriber identity card remains detected and whether there is any command waiting to be processed for each of the polled SIM instances; and
if so, processing at least one determined command from the polled SIM instances.

18. The method of claim 17, wherein the step of polling the SIM instances further comprises polling one of the SIM instances at a time for each of the subscriber numbers.

19. The method of claim 18, wherein the step of determining whether there is any command waiting to be processed further comprises:
issuing a first command to the subscriber identity card for activating the SIM instance;
receiving a response code corresponding to the first command from the subscriber identity card; and
determining whether the response code indicates the communication device to fetch a command.

20. The method of claim 19, further comprising:
storing information concerning fetching the proactive command, prior to processing the determined command, wherein the step of processing the determined command is performed when all SIM instances in the subscriber identity card are polled and every command corresponding to the SIM instances to be processed is determined.

21. The method of claim 17, wherein the step of processing the determined command further comprises issuing a second command to the subscriber identity card to fetch the determined command.

22. The method of claim 17, further comprising performing a connection release procedure in response to the subscriber identity card being undetected.

* * * * *